(12) United States Patent
Kanamoto et al.

(10) Patent No.: US 11,409,476 B2
(45) Date of Patent: Aug. 9, 2022

(54) SYSTEM, INFORMATION PROCESSING APPARATUS, AND CONTROL METHOD OF THE SAME

(71) Applicant: CANON KABUSHIKI KAISHA, Tokyo (JP)

(72) Inventors: Yoshiji Kanamoto, Tokyo (JP); Toshihiko Iida, Ibaraki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/381,055

(22) Filed: Jul. 20, 2021

(65) Prior Publication Data

US 2022/0027102 A1    Jan. 27, 2022

(30) Foreign Application Priority Data

Jul. 22, 2020 (JP) .............................. JP2020-125691

(51) Int. Cl.
*G06F 3/12* (2006.01)

(52) U.S. Cl.
CPC .......... *G06F 3/1208* (2013.01); *G06F 3/1207* (2013.01); *G06F 3/1253* (2013.01); *G06F 3/1272* (2013.01); *G06F 3/1285* (2013.01)

(58) Field of Classification Search
None
See application file for complete search history.

(56) References Cited

U.S. PATENT DOCUMENTS

| 6,678,067 B1 | 1/2004 | Reda et al. |
| 8,687,221 B1 | 4/2014 | Bergmans et al. |
| 8,874,565 B1 * | 10/2014 | Kapoor ................. G06F 16/951 707/726 |
| 2018/0136887 A1 * | 5/2018 | Heap .................... G06F 3/1247 |

FOREIGN PATENT DOCUMENTS

| CN | 105354281 A | * | 2/2016 |
| JP | 2014155124 A | | 8/2014 |
| JP | WO-2020130024 A1 | * | 6/2020 |
| JP | WO-2020138130 A1 | * | 7/2020 |

* cited by examiner

*Primary Examiner* — Fan Zhang
(74) *Attorney, Agent, or Firm* — Canon U.S.A., Inc. IP Division

(57) ABSTRACT

Quality request data of a printed product including information regarding a print quality request of a printed product, and information regarding a tolerable variation of a print quality request of a plurality of printed products is received, and whether quality of a printed product is satisfied is determined based on information regarding a print quality request of a printed product, and information regarding a tolerable variation of a print quality request of a plurality of printed products that is included in the quality request.

9 Claims, 28 Drawing Sheets

FIG.4

| | |
|---|---|
| BOOTLOADER | ~401 |
| OPERATING SYSTEM | ~402 |
| NETWORK CONTROL PROGRAM | ~403 |
| FIRST RECEIVING PROGRAM | ~404 |
| FIRST TRANSMISSION PROGRAM | ~405 |
| JDF FUNCTION PROGRAM | ~406 |
| PDF FUNCTION PROGRAM | ~407 |
| MEDIA MANAGEMENT PROGRAM | ~408 |
| SHEET COUNT PROGRAM | ~409 |
| INSPECTION PROGRAM | ~410 |

FIG.5

| | |
|---|---|
| BOOTLOADER | ~501 |
| OPERATING SYSTEM | ~502 |
| NETWORK CONTROL PROGRAM | ~503 |
| WEB SERVER | ~504 |
| WORKFLOW CONTROL PROGRAM | ~505 |
| DATA INPUT SYSTEM PROGRAM | ~506 |
| SECOND RECEIVING PROGRAM | ~507 |
| SECOND TRANSMISSION PROGRAM | ~508 |

FIG.6

| | |
|---|---|
| BOOTLOADER | ~601 |
| OPERATING SYSTEM | ~602 |
| NETWORK CONTROL PROGRAM | ~603 |
| WEB BROWSER | ~604 |
| PDF CREATION PROGRAM | ~605 |
| PRX CREATION PROGRAM | ~606 |
| JDF CREATION PROGRAM | ~607 |
| THIRD TRANSMISSION PROGRAM | ~608 |
| THIRD RECEIVING PROGRAM | ~609 |

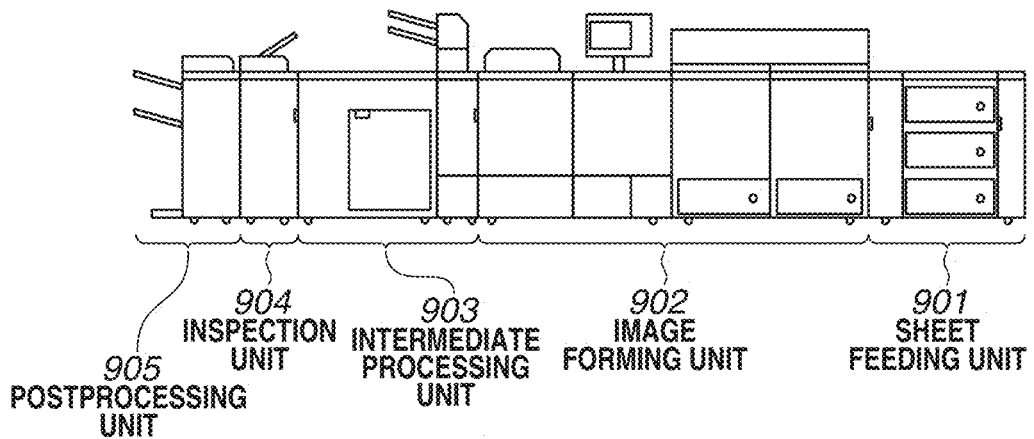
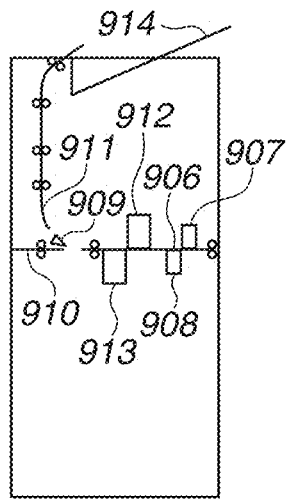
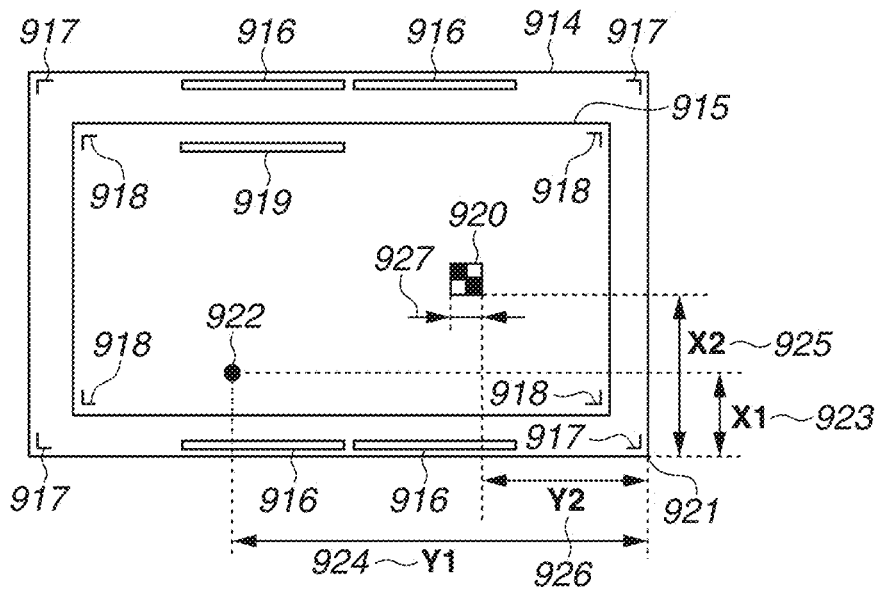

FIG.10B

Brand Owner's Application — 1000

File 1001 | PDF edit 1002 | PRX setting 1003 | JDF setting 1004 | Help 1005

Master Information — 1020
Date: 2019/3/27
Company Name: ABC Ltd.
Location: ***
Quality Spec Name: Product AAA
Quality Spec Version: 30
[Edit] — 1021

Quality Goal(Grade) — 1022

| | Label 1023 | Rank 1024 | Value 1025 | 1026 |
|---|---|---|---|---|
| ☐ | Excellent | 10 | GT 10.0 | Edit |
| ☐ | Good1 | 9 | GT 9.0 | Edit |
| ☐ | Good2 | 8 | GT 8.0 | Edit |
| ☐ | Good3 | 7 | GT 7.0 | Edit |
| ☐ | Good4 | 6 | GT 6.0 | Edit |
| ☐ | Average1 | 5 | GT 5.0 | Edit |
| ☐ | Average2 | 4 | GT 4.0 | Edit |
| ☐ | Average3 | 3 | GT 3.0 | Edit |
| ☐ | Poor | 2 | LT 3.0 | Edit |

1030 1031 1032 1033 1034 1035 1036 1037 1038

[Add] — 1028

[Delete] — 1027
■ Tolerance Rank Value — 1046
☐ Minimum acceptable Rank Value
☐ Desired Rank Value 1.0 — 1029
    — 1081
    — 1082

Color Score — 1023  1024 1041 1040  1026

| | Label | Rank | Value(dE) | |
|---|---|---|---|---|
| ☐ | Excellent | 10 | LT 1.0 | Edit |
| ☐ | Good | 9 | LT 2.0 | Edit |
| ☐ | Acceptable | 8 | LT 4.0 | Edit |
| ☐ | Poor | 2 | GT 4.0 | Edit |

1046 1047 1048 1049 1050

[Delete] 1027 [Add] 1028 [Details..] 1045 Desired Rank 10 — 1043
Minimum Rank 8 — 1042
Variable cs — 1044

Registration — 1023  1024 1052 1051  1026

| | Label | Rank | Value(mm) | |
|---|---|---|---|---|
| ☐ | Excellent | 10 | LT 0.002 | Edit |
| ☐ | Acceptable | 5 | LT 0.005 | Edit |
| ☐ | Poor | 2 | GT 0.005 | Edit |

1046 1057 1058 1059

[Delete] 1027 [Add] 1028 [Details..] 1053 Desired Rank 10 — 1055
Minimum Rank 5 — 1056
Variable rg — 1054

Barcode — 1060
■ Test barcode
Variable bc — 1061  [Location...] — 1062  — 1063

Formula
lambda(bc cs rg)(bc*(cs+rg*4)/5) — 1039

FIG. 10C

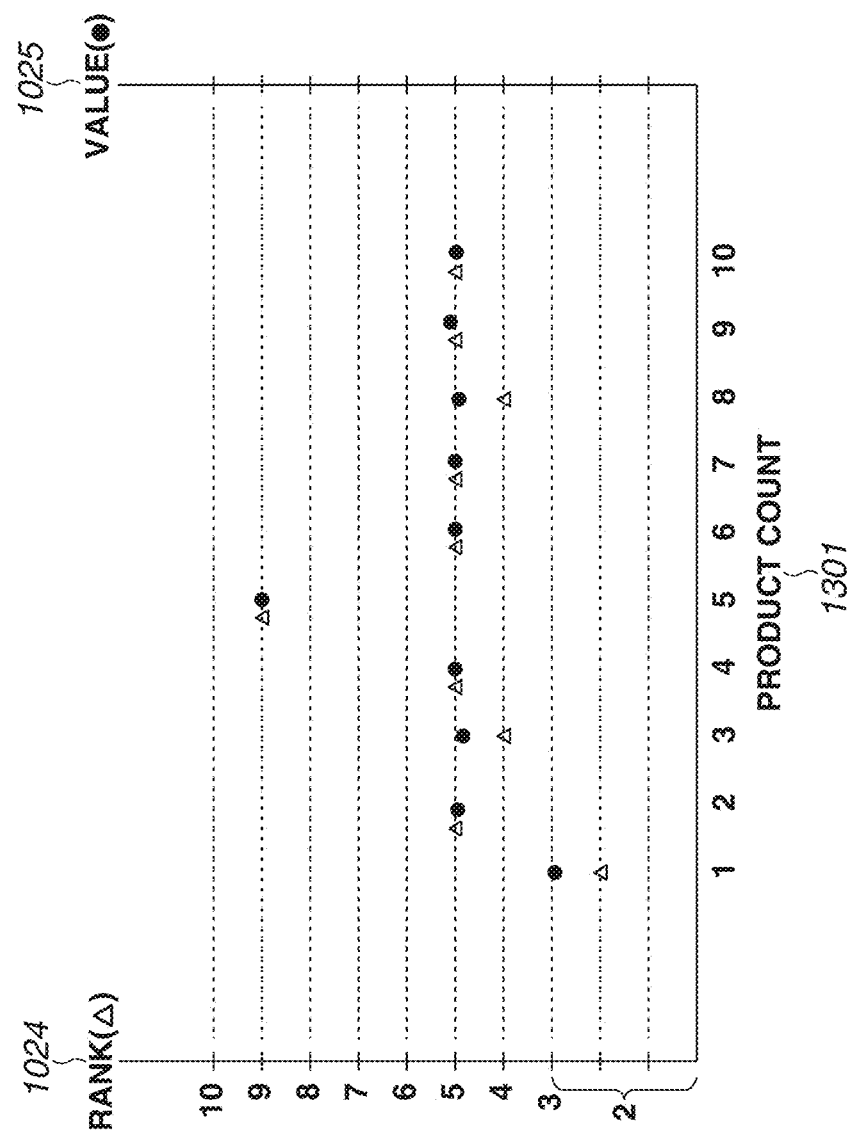

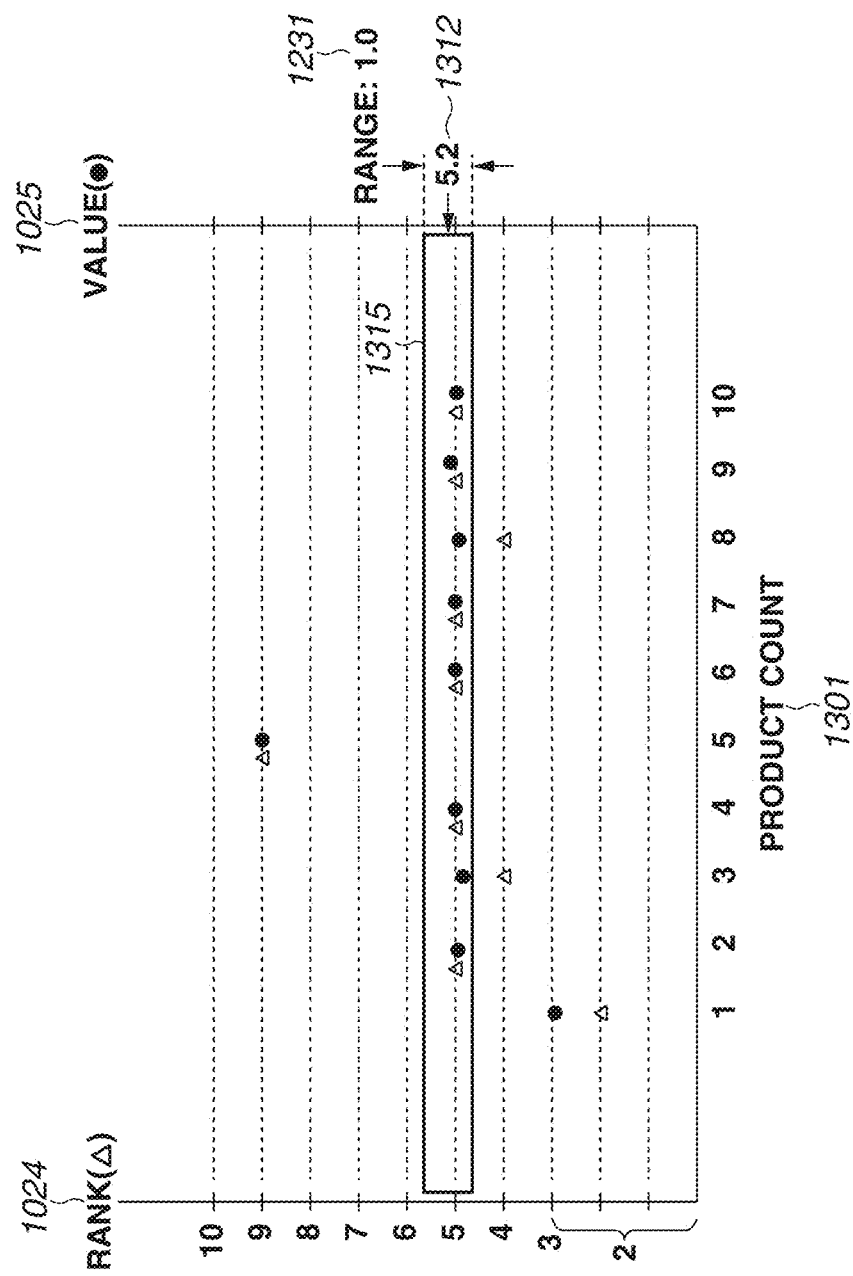

FIG.12A

```
<?xml version="1.0" encoding="UTF-8"?>
<JDF ID="ID01" JobPartID="JobPartID01" Type="Combined"
  Types="LayoutPreparationImposition Interpreting Rendering DigitalPrinting"
  Activation="Active" Status="Ready" Version="1.3" Category="DigitalPrinting"
  ICSVersions="IDP_L1-1.0 Base_L1-1.0" MaxVersion="1.3"
  xmlns="http://www.CIP4.org/JDFSchema_1_1"
  xmlns:cj="http://www.canon.com/ns/CanonJDF"
  JobID="JobID01" DescriptiveName="ProductAAA">

<ResourcePool>

<RunListClass="Parameter" ID="IDRL" Status="Available" PartIDKeys="Run">
      <RunListRun="0">
        <LayoutElement>
          <FileSpecMimeType="application/pdf" URL="cid:Sample" TotalPage="250"/>
        </LayoutElement>
      </RunList>                                                           1201
    </RunList>
1202 ─ <DigitalPrintingParamsClass="Parameter" ID="IDDPP" Status="Available"
          Collate="SheetSetAndJob" PartIDKeys="RunIndex"Amount="2000000" Lot="1000">
        <MediaRefrRef="MED_000"/> ~1204
                                                             1203    1293
1206 ─ <DigitalPrintingParamsRunIndex="4 199~209 249">
        <MediaRefrRef="Med_001"/>
      </DigitalPrintingParams>   1205
                      1207
1208 ─ <DigitalPrintingParamsRunIndex="0"> ~1209
        <MediaRefrRef="Med_002"/> ~1210
      </DigitalPrintingParams>

</DigitalPrintingParams>                                             1212
1211 ─ <Media ID="MED_000" Class="Consumable" Status="Available" Dimension="842 1191"
          DesciptiveName="Media1"/> ~1213                                 ─1215
1214 ─ <Media ID="MED_001" Class="Consumable" Status="Available" Dimension="842 1191"
          DesciptiveName="Media2(coated)"/> ~1216
1217 ─ <Media ID="MED_002" Class="Consumable" Status="Available" Dimension="842 1191"
          DesciptiveName="Media3(cardboard)"/>
                                                                          1218
  </ResourcePool>                       1219
  <ResourceLinkPool>

</ResourceLinkPool>
</JDF>
```

FIG.12B1

```xml
<?xml version="1.0" encoding="UTF-8"?>
<PRX xmlns:prx="http://xxx.org/prx" xmlns:cc="http://yyy.com/CxF" xmlns="http://zzz.org/prx"
xmlns:xsi="http://www.w3.org/2001/XMLSchema-instance"
xsi:schemaLocation="http://xxx.yyy.zzz.org/prx PRX.xsd">

<PRXInfo><PRXDate>2019-03-27</PRXDate><PRXId>xxx</PRXId></PRXInfo>                      ⎫
    <BuyerInfo><CompanyName>ABC Ltd.</CompanyName><Location>xxx</Location></BuyerInfo>    ⎬ 1220
                                                                                           ⎭
1221 — <GradingInfo>
1222 —   <Grade DisplayLabel="Excellent" Rank="10"><ValueRange>
            <LogicalOperator>GT</LogicalOperator><CalculatedValue>10.0</CalculatedValue>
         </ValueRange></Grade>
1223 —   <Grade DisplayLabel="Good1" Rank="9"><ValueRange>
            <LogicalOperator>GT</LogicalOperator><CalculatedValue>9.0</CalculatedValue>
         </ValueRange></Grade>
1224 —   <Grade DisplayLabel="Good2" Rank="8"><ValueRange>
            <LogicalOperator>GT</LogicalOperator><CalculatedValue>8.0</CalculatedValue>
         </ValueRange></Grade>
1225 —   <Grade DisplayLabel="Good3" Rank="7"><ValueRange>
            <LogicalOperator>GT</LogicalOperator><CalculatedValue>7.0</CalculatedValue>
         </ValueRange></Grade>
1226 —   <Grade DisplayLabel="Good4" Rank="6"><ValueRange>
            <LogicalOperator>GT</LogicalOperator><CalculatedValue>6.0</CalculatedValue>
         </ValueRange></Grade>
1227 —   <Grade DisplayLabel="Average1" Rank="5"><ValueRange>
            <LogicalOperator>GT</LogicalOperator><CalculatedValue>5.0</CalculatedValue>
         </ValueRange></Grade>
1228 —   <Grade DisplayLabel="Average2" Rank="4"><ValueRange>
            <LogicalOperator>GT</LogicalOperator><CalculatedValue>4.0</CalculatedValue>
         </ValueRange></Grade>
1229 —   <Grade DisplayLabel="Average3" Rank="3"><ValueRange>
            <LogicalOperator>GT</LogicalOperator><CalculatedValue>3.0</CalculatedValue>
         </ValueRange></Grade>
1230 —   <Grade DisplayLabel="Poor" Rank="3"><ValueRange>
            <LogicalOperator>LT</LogicalOperator><CalculatedValue>3.0</CalculatedValue>
         </ValueRange></Grade>
1231 —   <ToleranceRankValue="1.0"/>
1232 —   <Formula>lambda(bccsrg)(bc*(cs+rg*4)/5)</Formula>

</GradingInfo>

<QualityGoals>
1233 —   <ColorScore>
            <ColorScoringScale>
1235 —         <UoM>dE</UoM>
               <CxFReference>CXF1</CxFReference>   — 1234
1236 —         <ParameterScoreDisplayLabel="Excellent" Rank="10"><ValueRange>
                  <LogicalOperator>LT</LogicalOperator><CalculatedValue>1.0</CalculatedValue>
               <ValueRange></ParameterScore>
1237 —         <ParameterScoreDisplayLabel="Good" Rank="9"><ValueRange>
                  <LogicalOperator>LT</LogicalOperator><CalculatedValue>2.0</CalculatedValue>
               <ValueRange></ParameterScore>
```

FIG.12B2

```
1238 —      <ParameterScoreDisplayLabel="Acceptable" Rank="8"><ValueRange>
                <LogicalOperator>LT</LogicalOperator><CalculatedValue>4.0</CalculatedValue>
                </ValueRange></ParameterScore>
1239 —      <ParameterScoreDisplayLabel="Poor" Rank=""><ValueRange>
                <LogicalOperator>GT</LogicalOperator><CalculatedValue>4.0</CalculatedValue>
                </ValueRange></ParameterScore>
            </ColorScoringScale>
            <MinimumAcceptableRank>8</MinimumAcceptableRank> — 1240
1241 —      <DesiredRank>10</DesiredRank>
            <CalculationVariable>cs</CalculationVariable> — 1242
1243 —      <SamplingPositionMatrix><UoM>mm</UoM><XPosition>12.34</Xposition><YPosition>5.23</Yposition>
            </SamplingPositionMatrix>
            </ColorScore>

1244 —  <Registration>
1245 —      <UoM>mm</UoM>
            <ScoringInfo>
1246 —      <ParameterScoreDisplayLabel="Excellent" Rank="10"><ValueRange>
                <LogicalOperator>LT</LogicalOperator><CalculatedValue>0.002</CalculatedValue>
                </ValueRange><ParameterScore>
1247 —      <ParameterScoreDisplayLabel="Acceptable" Rank="5"><ValueRange>
                <LogicalOperator>LT</LogicalOperator><CalculatedValue>0.005</CalculatedValue>
                </ValueRange><ParameterScore>
1248 —      <ParameterScoreDisplayLabel="Poor" Rank=""><ValueRange>
                <LogicalOperator>GT</LogicalOperator><CalculatedValue>0.005</CalculatedValue>
                </ValueRange><ParameterScore>
            </ScoringInfo>
            <MinimumAcceptableRank>5</MinimumAcceptableRank> — 1249
1250 —      <DesiredRank>10</DesiredRank>
            <CalculationVariable>rg</CalculationVariable> — 1251
1252 —      <SamplingPositionMatrix><UoM>mm</UoM><XPosition>3.00</Xposition><YPosition>3.00</Yposition>
            </SamplingPositionMatrix>
            </Registration>

1253 —  <Barcode>
            <BarcodeScore>
1254 —      <BarcodeScoringScaleDisplayLabel="pass" Rank="1"><Value>1</Value></BarcodeScoringScale>
1255 —      <BarcodeScoringScaleDisplayLabel="fail" Rank="0"><Value>0</Value></BarcodeScoringScale>
            </BarcodeScore>
1256 —      <MinimumAcceptableRank>1</MinimumAcceptableRank>
1257 —      <DesiredRank>1</DesiredRank>
            <CalculationVariable>bc</CalculationVariable> — 1258
1259 —      <SamplingPositionMatrix><UoM>mm</UoM><XPosition>200.00</Xposition><YPosition>100.00</Yposition>
            </SamplingPositionMatrix>
            </Barcode>

</QualityGoals>

1260 —  <CxFReferenceData>
            <CxF><Object ID="CXF1"> — 1261
1262 —      <ReflectanceSpectrum>0.222 0.333 0.444 0.001 0.222 0.234 0.111 0.333 0.555 0.666 ... 0.222</ReflectanceSpectrum>
            </Object></CxF>
        </CxFReferenceData>
        </PRX>
```

FIG.12C

MEASURED DATA:
DATE: 2019-3-27:
TIME: 11:45:00 JST:

SHEET LOCATIONMETERAGE: 221.35M: ～1263
METADATA: (XXXX:YYY), (ZZZ:AAA), (BBB:CCC):

SPECTRUM DATA:
0.222
0.333
0.444
0.001
0.222
0.234
0.111   ～1264
0.333
0.555
0.666
...
0.222
SPECTRUM DATA END:

DELTA_E: 1.9: ～1265

REGISTRATION DATA:
X DIRECTION OFFSET: 0.001:
Y DIRECTION OFFSET: 0.001: ～1266
REGISTRATION DATA END:

BARCODE TEST DATA:
RESULT: PASS:～1267
BARCODE TEST DATA END:

FIG.12D

```xml
<?xml version="1.0" encoding="UTF-8"?>
<PQX xmlns:pqx="http://xxx.org/pqx" xmlns:cc="http://yyy.com/CxF" xmlns="http://zzz.org/pqx"
xmlns:xsi="http://www.w3.org/2001/XMLSchema-instance"
xsi:schemaLocation="http://xxx.yyy.zzz.org/pqx PQX.xsd">                                      1269

<PQXInfo><PQXDate>2019-03-27</PQXDate><PQXId>xxx</PQXId></PQXInfo>
    <PrinterInfo><CompanyName>AAA Printing Company</CompanyName><Location>xxxxx</Location></PrinterInfo>

<PressRunInfo>  1270
        <DatePrinted>2019-03-27</DatePrinted>
        <PrinterLotId>Lot No.3</PrinterLotId>
        <RunLengthTotalRolls="10" TotalPackage="" TotalMeterage="2000" UoM="mt"/>
        <PrintMethod>ElectroPhotography</PrintMethod>
        <PressOperator>Mr. Right</PressOperator>
        <PrinterJobNumber>JobID01</PrinterJobNumber>
    </PressRunInfo>

<ReporterCollection>....</ReporterCollection>
    <CustomerCollection><Customer>ABC Ltd.</Customer></CustomerCollection>

<SampleCollection>  1271
        <Sample>
            <SampleDescription>  1272
                <RunPositionRoll="5" Sheet="" Meterage="1000" UoM="mt"/>  1273
            </SampleDescription>

<ColorReport>  1274
                <Measurement Id="001">
                    <CxFSampleObjectIdLink>CXF001</CxFSampleObjectIdLink>  1275      1276
                </Measurement>
                <SamplingPositionMatrix><UoM>mm</UoM><XPosition>12.34</Xposition><YPosition>5.23</Yposition>
                <DeltaE="1.9"/>  1277
            </ColorReport>

<RegistrationReport>  1278
                <UoM>mt</UoM>
                <XMaxOffset>0.001</XMaxOffset>  1279                           1281
                <YMaxOffset>0.002</YMaxOffset>  1280
                <SamplingPositionMatrix><UoM>mm</UoM><XPosition>3.00</Xposition><YPosition>3.00</Yposition>
            </RegistrationReport>

<BarcodeReport>  1282
                <ISO2DVerification>
                    <Decoce>pass</Decode>  1283                                1284
                </ISO2DVerification>
                <SamplingPositionMatrix><UoM>mm</UoM><XPosition>200.00</Xposition><YPosition>100.00</Yposition>
            </BarcodeReport>

</Sample>
    </SampleCollection>
                                                                               1286
    <CxFSampleData>
        <CxFId="CxF001">  1285
            <ReflectanceSpectrum>0.221 0.330 0.443 0.001 0.221 0.235 0.110 0.330 0.559 0.662 ... 0.221</ReflectanceSpectrum>
        <CxF>
    </CxFSampleData>

<QualityToleranceReport>  1287
        <AverageValue>5.2</AverageValue>  1288
        <ItemCount>501</ItemCount>  1289   1290
        <CalculatedValue>5.0</CalculatedValue>  1290
        <DeviationResport>0.2</DeviationReport>  1291
        <ToleranceResult>PASS</ToleranceResult>  1292
    </QualityToleranceReport>

</PQX>
```

FIG.13A

| PRODUCT (COUNT) 1301 | VALUE 1025 | RANK 1024 |
|---|---|---|
| 1 | 2.9 | 2 |
| 2 | 5.0 | 5 |
| 3 | 4.8 | 4 |
| 4 | 5.1 | 5 |
| 5 | 9.0 | 9 |
| 6 | 5.1 | 5 |
| 7 | 5.0 | 5 |
| 8 | 4.9 | 4 |
| 9 | 5.2 | 5 |
| 10 | 5.0 | 5 |

FIG.13B

| PRODUCT (COUNT) 1301 | VALUE 1025 | RANK 1024 | DEVIATION 1013 | WHETHER VARIATION FALLS WITHIN TOLERABLE RANGE 1014 |
|---|---|---|---|---|
| 1 | 2.9 | 2 | 3.2 | × |
| 2 | 5.0 | 5 | 0.2 | ○ |
| 3 | 4.8 | 4 | 0.4 | ○ |
| 4 | 5.1 | 5 | 0.1 | ○ |
| 5 | 9.0 | 9 | 3.8 | × |
| 6 | 5.1 | 5 | 0.1 | ○ |
| 7 | 5.0 | 5 | 0.2 | ○ |
| 8 | 4.9 | 4 | 0.3 | ○ |
| 9 | 5.2 | 5 | 0.0 | ○ |
| 10 | 5.0 | 5 | 0.2 | ○ |

AVERAGE: 5.2 ~ 1312

FIG.13C

S(i): i-TH SCORE VALUE (CALCULATED VALUE)

$\overline{S}$: AVERAGE VALUE OF SCORE VALUES

DEVIATION = $|S(i) - \overline{S}| < 1.0/2$

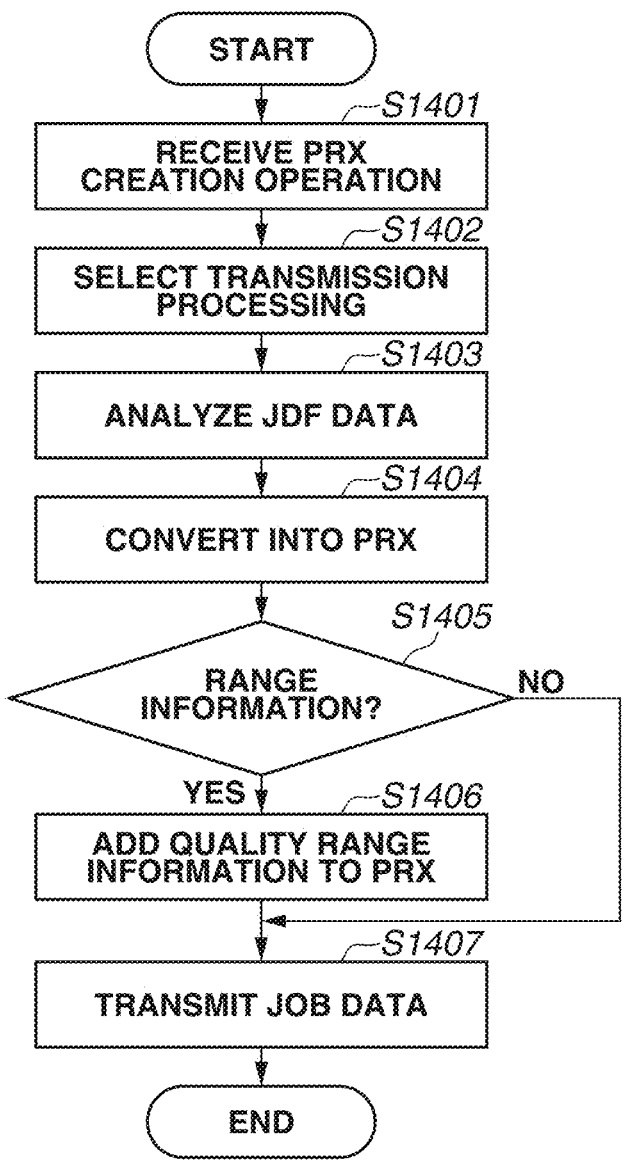

FIG.18A

```
<?xml version="1.0" encoding="UTF-8"?>
<PRX xmlns:prx="http://xxx.org/prx" xmlns:cc="http://yyy.com/CxF" xmlns="http://zzz.org/prx"
xmlns:xsi="http://www.w3.org/2001/XMLSchema-instance"
xsi:schemaLocation="http://xxx.yyy.zzz.org/prxPRX.xsd">

<PRXInfo><PRXDate>2019-03-27</PRXDate><PRXId>xxx</PRXId></PRXInfo>
  <BuyerInfo><CompanyName>ABC Ltd.</CompanyName><Location>xxx</Location></BuyerInfo>

<GradingInfo>

⋮
      ⋮

</ValueRange></Grade>
     <TorelanceRankValue="1.0"/>～1231
     <MinimumAcceptableRank="5.0"/>～1801
     <Formula>lambda(bccsrg)(bc*(cs+rg*4)/5))</Formula>

</GradingInfo>
```

FIG.18B

```
<?xml version="1.0" encoding="UTF-8"?>
<PRX xmlns:prx="http://xxx.org/prx" xmlns:cc="http://yyy.com/CxF" xmlns="http://zzz.org/prx"
xmlns:xsi="http://www.w3.org/2001/XMLSchema-instance"
xsi:schemaLocation="http://xxx.yyy.zzz.org/prxPRX.xsd">

<PRXInfo><PRXDate>2019-03-27</PRXDate><PRXId>xxx</PRXId></PRXInfo>
  <BuyerInfo><CompanyName>ABC Ltd.</CompanyName><Location>xxx</Location></BuyerInfo>

<GradingInfo>

⋮
      ⋮

</ValueRange></Grade>
     <TorelanceRankValue="1.0"/>～1231
     <DesiredRank="6.0"/>～1804
     <Formula>lambda(bccsrg)(bc*(cs+rg*4)/5))</Formula>

</GradingInfo>
```

FIG.20A

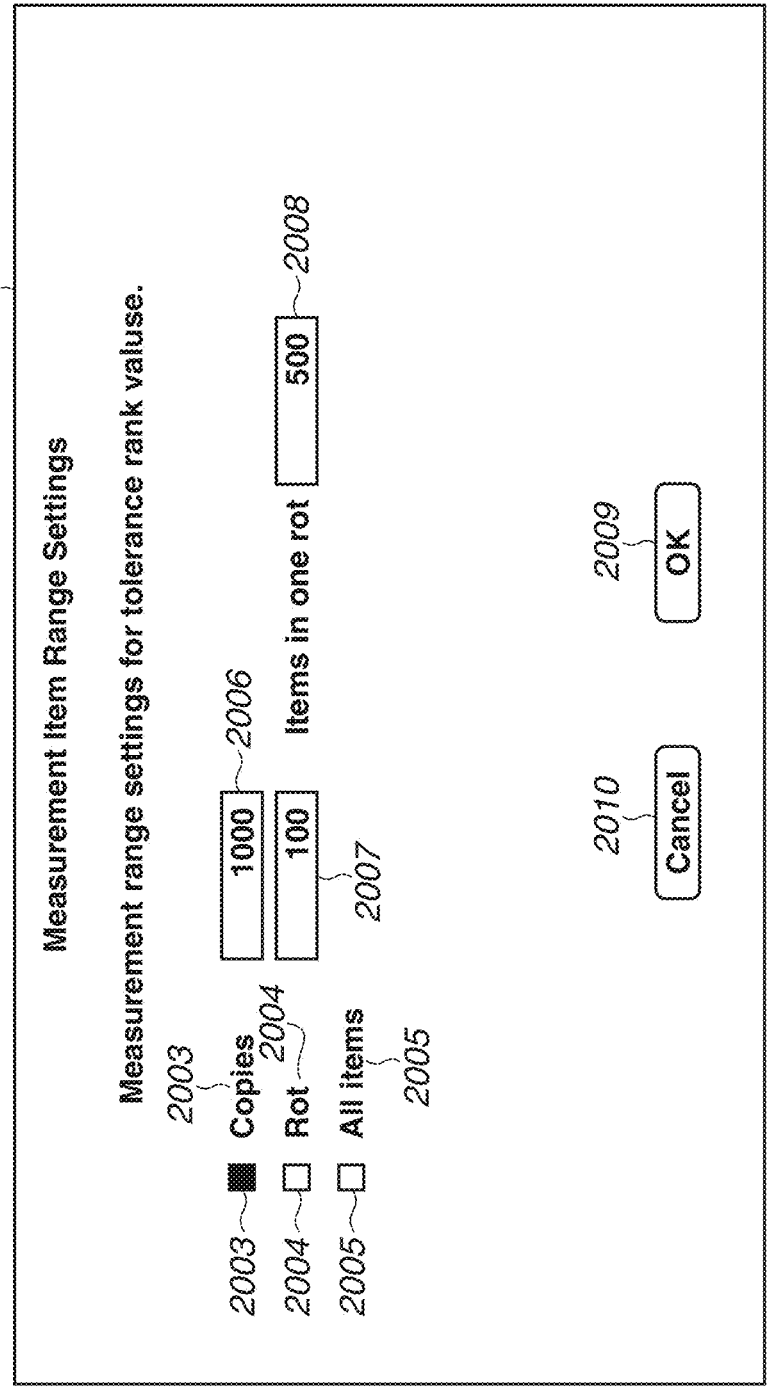

SYSTEM, INFORMATION PROCESSING APPARATUS, AND CONTROL METHOD OF THE SAME

BACKGROUND OF THE INVENTION

Field of the Invention

The present invention relates to a quality request or a quality report of a printed product.

Description of the Related Art

In the commercial printing field, it is assumed to electronically exchange information for issuing a request and a report regarding the quality of a product ordered from an orderer to a printing business operator. As an example of techniques for implementing this, there are standard techniques such as Print Quality eXchange, Print Request eXchange (PQX/PRX) and a Job Definition Format (JDF). Such a technique computerizes a series of processes for transmitting a request of product quality requested by an orderer from a printing business operator, by PRX, and reporting the quality of a product produced by the printing business operator, to the orderer by PQX.

A product quality request/report system further bears issues in providing the user with convenience. Specifically, the product quality request/report system bears the following issues.

The description will be given using a case where a single type of a printed product such as a package is produced in large amounts as a product in commercial printing, for example. Demanded quality relates to a color difference or misregistration, for example. In the case of requesting the levels of these, that is to say, in the case of making a request regarding quality from an orderer to a printing manufacturer, higher quality does not always satisfy the orderer depending on the situation.

For example, even if a product satisfies designated required quality and has quality exceeding a request, an individual difference or a variation in quality such as a color difference or misregistration among products produced in large amounts is perceived as a problem in some cases. That is to say, if a product having an extraordinarily high quality index gets mixed into products in producing products with constant quality, the product stands out as compared with products with other qualities, and quality uniformity of products is consequently impaired. When commercial goods that use these products are arranged on display in a shop, if a variation in quality exists among products, consistency and uniformity are consequently impaired. In contrast, if color differences are uniformed at equivalent levels, or if misregistrations occur at equivalent levels, a variation does not exist from these quality aspects. In other words, consistency and uniformity are ensured when products are arranged as commercial goods on display in a shop, for example.

SUMMARY OF THE INVENTION

The present invention is directed to a technique of enabling a quality request of a product to be made considering not only the quality of a product but also a variation in quality among product sets.

According to an aspect of the present invention, a system includes a first information processing apparatus, and a second information processing apparatus, wherein the first information processing apparatus includes a first reception unit configured to receive a setting of a print quality request of a printed product, a second reception unit configured to receive a setting of a tolerable variation of a print quality request of a plurality of printed products, and a transmission unit configured to transmit quality request data of a printed product including information regarding a print quality request of the printed product, and information regarding a tolerable variation of a print quality request of the plurality of printed products, wherein the second information processing apparatus includes a receiving unit configured to receive quality request data of a printed product including information regarding a print quality request of the printed product, and information regarding a tolerable variation of a print quality request of the plurality of printed products, and a determination unit configured to determine whether quality of a printed product is satisfied, based on information regarding a print quality request of a printed product, and information regarding a tolerable variation of a print quality request of a plurality of printed products that is included in the quality request, and wherein, in a case where the printed product satisfies a print quality request of a printed document that is included in the quality request data, in a case where the printed product does not satisfy a tolerable variation included in the quality request data, it is determined that the printed product does not satisfy a print quality request.

Further features of the present invention will become apparent from the following description of exemplary embodiments with reference to the attached drawings.

BRIEF DESCRIPTION OF THE DRAWINGS

FIG. 4 is a software configuration diagram of an image forming apparatus according to an exemplary embodiment.

FIG. 5 is a software configuration diagram of an information processing apparatus of a printing business operator system according to an exemplary embodiment.

FIG. 6 is a software configuration diagram of an information processing apparatus of an orderer system according to an exemplary embodiment.

FIGS. 9A, 9B, and 9C are diagrams illustrating a configuration and an operation mechanism of an inspection apparatus of an image forming apparatus according to an exemplary embodiment.

FIG. 10B illustrates a screen example according to an exemplary embodiment.

FIG. 10C illustrates a screen example according to an exemplary embodiment.

FIG. 11A is a diagram illustrating determination of a product according to an exemplary embodiment.

FIG. 11B is a diagram illustrating determination of a product according to an exemplary embodiment.

FIG. 12A is a diagram illustrating a data format according to an exemplary embodiment.

FIGS. 12B1 and 12B2 are a diagram illustrating a data format according to an exemplary embodiment.

FIG. 12C is a diagram illustrating a data format according to an exemplary embodiment.

FIG. 12D is a diagram illustrating a data format according to an exemplary embodiment.

FIGS. 13A, 13B, and 13C illustrate examples of values of products according to an exemplary embodiment.

FIG. 14 is a first flowchart illustrating an operation of a data creation application unit and a web browser unit according to an exemplary embodiment.

FIGS. 18A and 18B are diagrams each illustrating a data format according to an exemplary embodiment.

FIG. 20A illustrates a screen example according to Modified Example 4 of an exemplary embodiment.

FIG. 20B illustrates a screen example according to Modified Example 4 of an exemplary embodiment.

DESCRIPTION OF THE EMBODIMENTS

Hereinafter, exemplary embodiments of the present invention will be described with reference to the drawings.

Exemplary Embodiment

Figure 1:
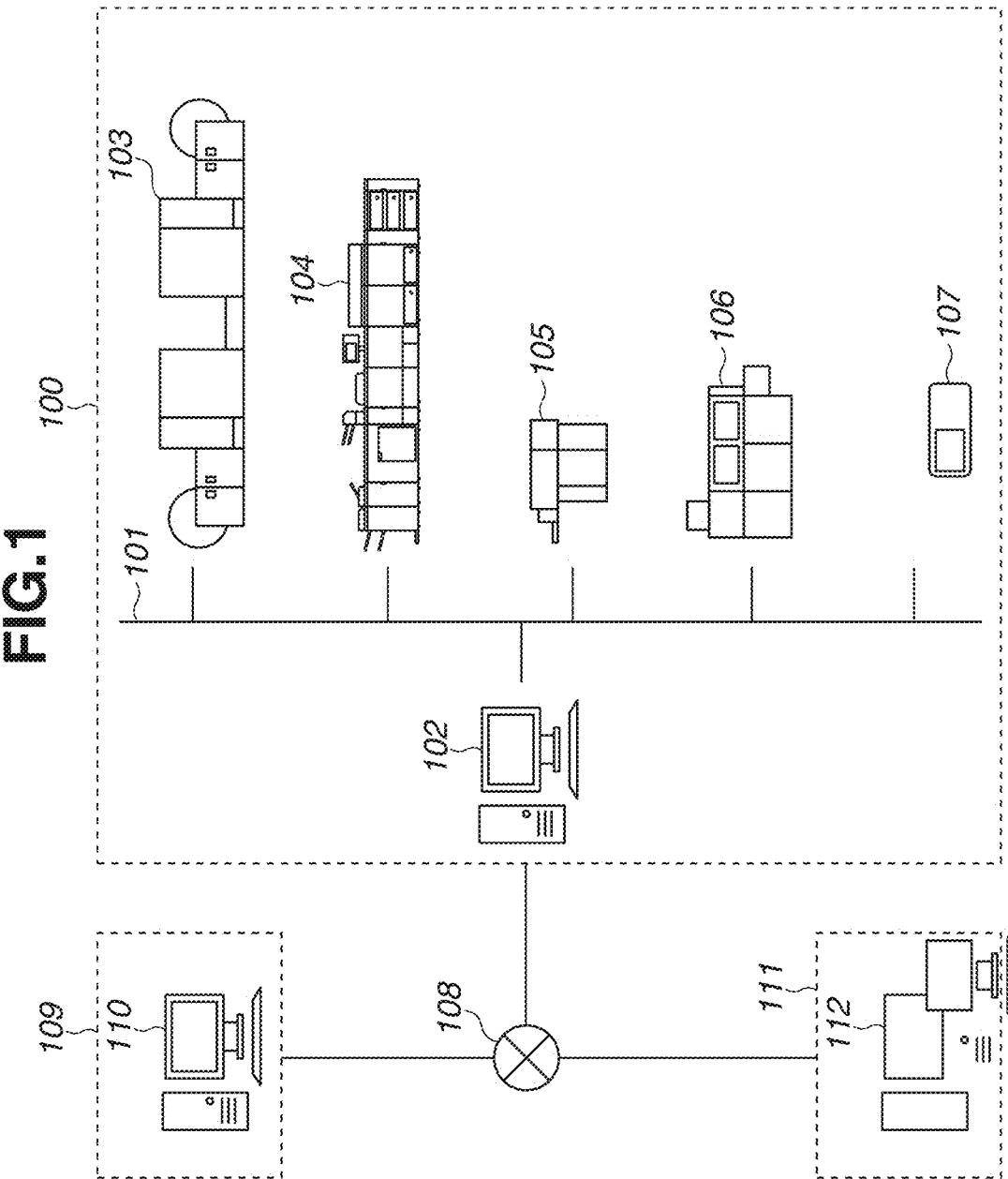
FIG. 1 is a block diagram illustrating a print processing system according to an exemplary embodiment.

FIG. 1 is a block diagram illustrating a system (print processing system) according to the present exemplary embodiment.

The system is broadly divided into an orderer system 109, a printing business operator system 100, and a parent company system 111 of a printing business operator. These systems are connected to each other via an internet 108. The orderer system 109 includes at least one or more information processing apparatuses 110. Similarly, the parent company system 111 also includes at least one or more information processing apparatuses 112.

Hereinafter, an internal configuration of the printing business operator system 100 will be described in detail. As illustrated in FIG. 1, a plurality of apparatuses is connected to each other via a network 101. As these apparatuses, an information processing apparatus 102, an image forming apparatus 103, an image forming apparatus 104, a laminating machine 105, an adhesive binding machine 106, and a colorimeter 107 are connected. The image forming apparatus 103 is an image forming apparatus for continuous business forms, and the image forming apparatus 104 is an image forming apparatus for cut sheets. Using these apparatuses having different printing mechanisms, the printing business operator can produce products ordered by an orderer, in most appropriate modes.

Each apparatus is controlled by workflow software operating on the information processing apparatus 102, and produces a product by processing job data input from the orderer system 109. The job data input from the orderer system 109 includes image data, a job ticket, and quality request data. The job ticket is data in a Job Definition Format (JDF), for example, and the quality request data is data in a Print Request eXchange (PRX) format, for example. Furthermore, the information processing apparatus 102 in the printing business operator system 100 also has a function of receiving a notification of a processing result of each of the above-described apparatuses, converting the notification into quality report data, and transmitting the quality report data to the orderer system 109. The format of the quality report data is a Print Quality eXchange (PQX) format, for example.

In the present exemplary embodiment, the description will be given of an example in which PRX is used for a print quality request of a printed product (printed document), and PQX is used for a quality report of a printed product. Nevertheless, the techniques to be used are not limited to the PRX and the PQX, and it is sufficient that data regarding a quality request of a printed product and data regarding a quality report of a printed product can be transmitted and received.

Figure 2:
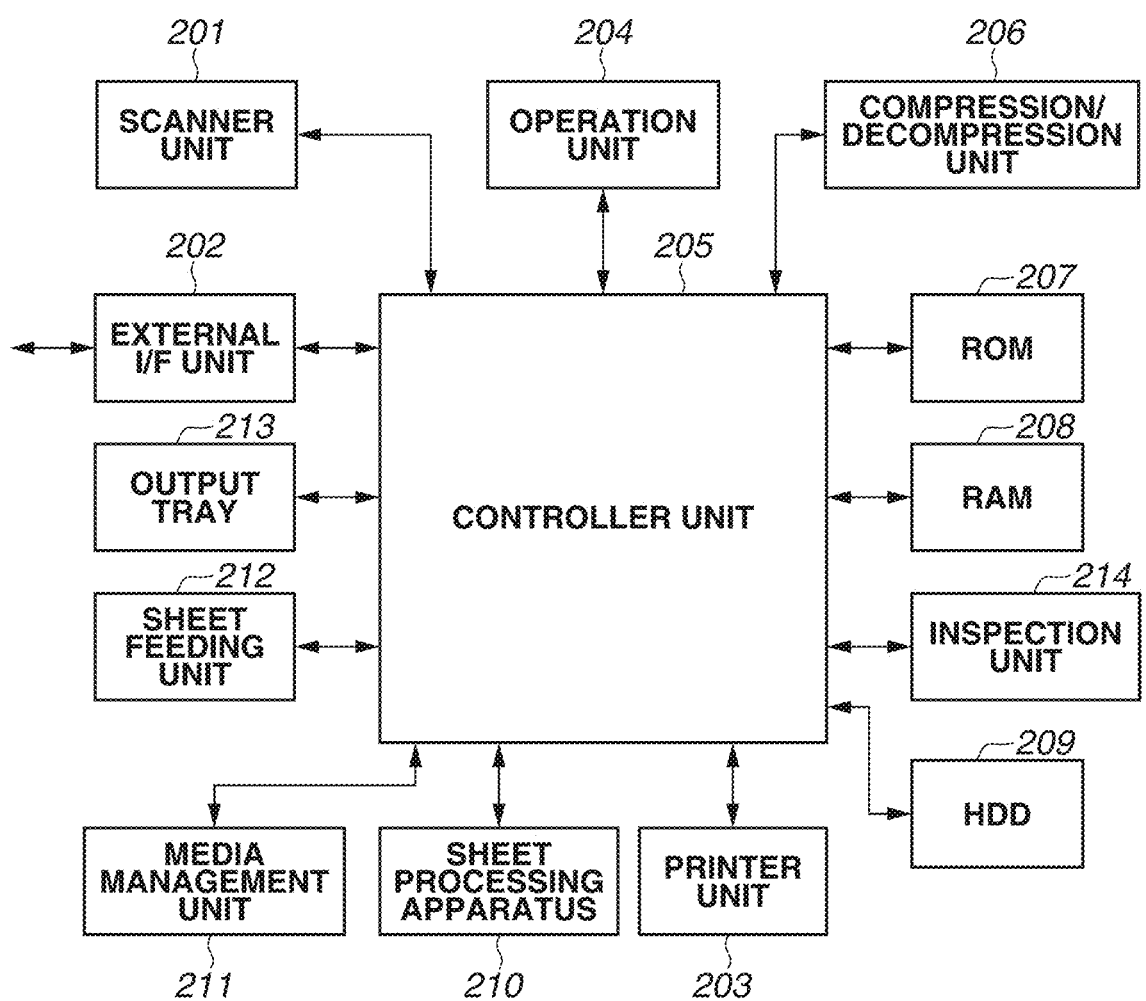
FIG. 2 is a hardware configuration diagram of an image forming apparatus according to an exemplary embodiment.

FIG. 2 is a diagram illustrating a hardware configuration of the image forming apparatus 104. The image forming apparatus 104 has a reading function of reading an image on a sheet, and a print function of printing an image onto a sheet. The image forming apparatus 104 also has a postprocessing function of binding a plurality of sheets on which images are printed, aligning a plurality of sheets, and sorting discharge destinations of a plurality of sheets into a plurality of trays. The sheets include paper such as plain paper and cardboard, and a film sheet.

The image forming apparatus 104 illustrated in FIG. 2 has a configuration in which a plurality of apparatuses having different roles is coupled to each other, and complicated sheet processing can be performed.

The image forming apparatus 104 is an apparatus for conveying rasterized image data to media stored in a sheet feeding unit 212, and forming an image onto the media using toner.

The image forming apparatus 104 includes a scanner unit 201 and an operation unit 204. The operation unit 204 provides various interfaces to be used when an operator performs various settings and operations of the image forming apparatus 104.

The image forming apparatus 104 according to the present exemplary embodiment has such a configuration that various auxiliary apparatuses can be attached. As an example of the auxiliary apparatuses, a sheet processing apparatus 210 is illustrated in the present exemplary embodiment.

The sheet processing apparatus 210 is an apparatus for obtaining a product by performing various types of processing on media on which images are formed by a printer unit 203.

An output tray 213 forms a tray unit for discharging and stacking output products processed by the sheet processing apparatus 210.

An inspection unit 214 is a module provided for inspecting image information formed on a sheet by the printer unit 203. The inspection unit 214 inspects an amount of a printing position shift (misregistration amount) of each plate of CMYK, a difference (color difference) between the color of an image formed by combining plates of CMYK, and a color defined by print data, and reading accuracy of a barcode portion included in a formed image. The inspection unit 214 also inspects general image defects such as wearing off and scratches on images. The inspection unit 214 has a function of converting such quality states and defects of images into inspection result data by optically reading images on sheets having been subjected to image formation.

A hard disc drive (HDD) 209 is a nonvolatile memory, and stores data of a plurality of processing target jobs and various types of management information. Job data received from the scanner unit 201 is printed by the printer unit 203 via the HDD 209. Job data received from an external apparatus via an external interface (I/F) unit 202 serving as an example of a communication unit is printed by the printer unit 203 via the HDD 209. The external I/F unit 202 exchanges image data with a facsimile, a network-connected device, and an external dedicated device. The operation unit 204 corresponds to a user interface unit and includes a display unit in this example.

A controller unit 205 (will also be referred to as a control unit or a central processing unit (CPU)) comprehensively controls processing and operations of various units included in the image forming apparatus 104. A read-only memory (ROM) 207 stores various control programs required in the present exemplary embodiment, including programs for executing various types of processing of flowcharts to be described below.

The ROM 207 also stores display control programs for displaying various user interface screens (hereinafter, will be referred to as UI screens) onto the display unit of the operation unit 204.

By reading out and executing programs stored in the ROM 207, the controller unit 205 causes the image forming apparatus 104 to execute various operations to be described in the present exemplary embodiment. The ROM 207 also stores a program for executing an operation of interpreting code data for forming print data in a portable document format (PDF) that has been received from an external apparatus via the external I/F unit 202, and rasterizing the data into raster image data. The ROM 207 also stores a program for interpreting and processing a print job received from an external apparatus via the external I/F unit 202. These are processed mainly by software.

The details of various programs to be stored in the ROM 207 will be described below.

In addition, the HDD 209 is a large-capacity storage device for storing image data compressed by a compression/decompression unit 206. The HDD 209 can store a plurality of pieces of data such as print data of a processing target job. The controller unit 205 performs control in such a manner that the printer unit 203 can print, via the HDD 209, data of a processing target job that has been input via various input units such as the scanner unit 201 and the external I/F unit 202. The controller unit 205 also performs control in such a manner that data can be transmitted to an external apparatus via the external I/F unit 202. In this manner, the controller unit 205 performs control in such a manner that various types of output processing of data of a processing target job stored in the HDD 209 can be executed. Furthermore, by reading out and executing a program stored in the ROM 207, the controller unit 205 can execute a function of sharing a file with an external apparatus, or transmitting or receiving a file to or from an external apparatus using a file system constructed in the HDD 209.

The compression/decompression unit 206 performs a compression/decompression operation of image data stored in a random access memory (RAM) 208 or the HDD 209, by various compression methods such as the Joint Bi-level Image Experts Group (JBIG) or the Joint Photographic Experts Group (JPEG). With the above-described configuration, the controller unit 205 serving as an example of a control unit included in the printing system also controls an operation of each sheet processing apparatus 210. A media management unit 211 is a module for managing information regarding a media type.

The inspection unit 214 is a module provided for inspecting image information formed on a sheet by the controller unit 205 controlling each module included in the image forming apparatus 104 illustrated in FIG. 2. Inspection result information obtained by conversion by the inspection unit 214 into inspection result data is transmitted to the information processing apparatus 102 via the external I/F unit 202.

Figure 3:
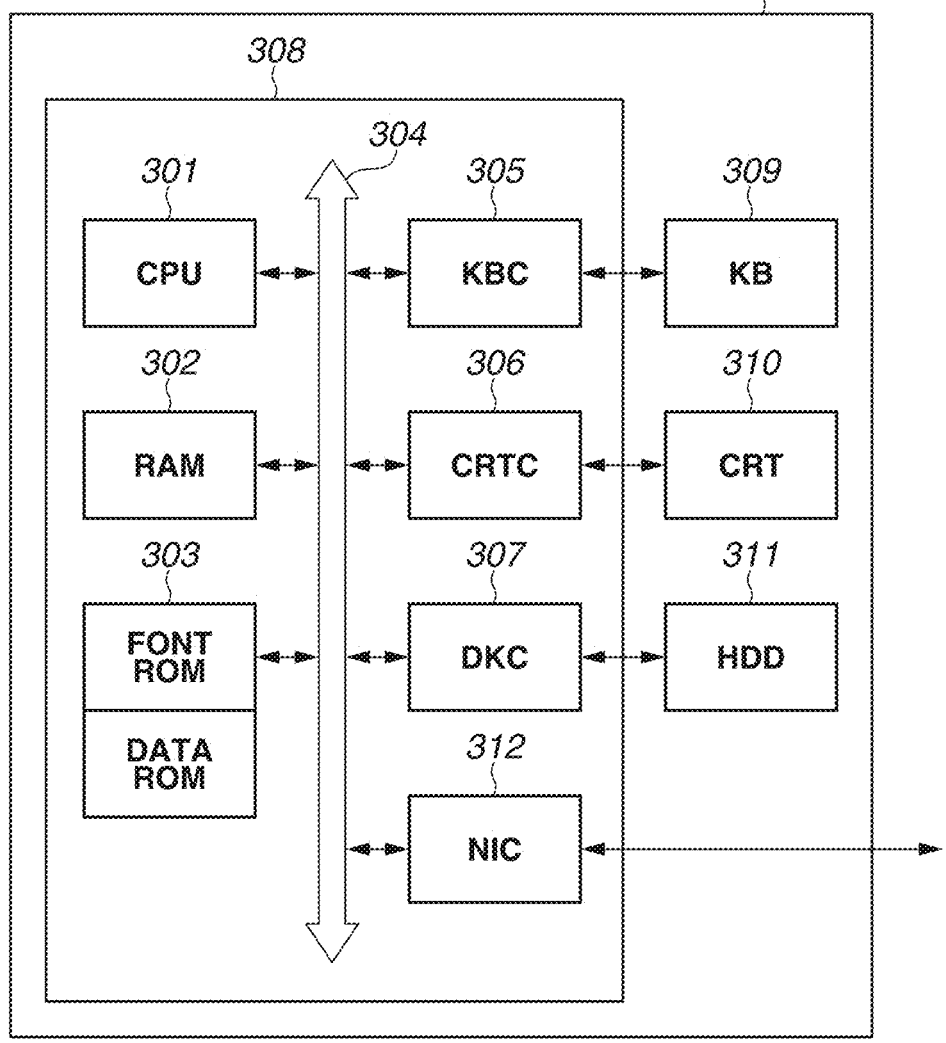
FIG. 3 is a hardware configuration diagram of an information processing apparatus according to an exemplary embodiment.

FIG. 3 is a block diagram illustrating a configuration of the information processing apparatuses 102, 110, and 112.

In FIG. 3, a CPU 301 executes a program of an operating system (OS) or a general application that is stored in a program ROM of a ROM 303, or loaded from an HDD 311 onto a RAM 302. The ROM 303 further includes a font ROM and a data ROM. The RAM 302 functions as a main memory or a work area of the CPU 301. A keyboard controller (KBC) 305 controls inputs from a keyboard and a pointing device (not illustrated). A display controller (CRTC) 306 controls display onto a display unit (CRT) 310. A disc controller (DKC) 307 controls access to the HDD 311 storing boot programs, various applications, and font data. A network controller (NIC) 312 is connected to a network, and executes communication control processing with another device connected to the network. A bus 304 connects the CPU 301, the RAM 302, the ROM 303, and various controllers, and conveys data signals and control signals.

When the information processing apparatus 102, 110, or 112 is a mobile terminal, a touch panel controller is sometimes included in place of the keyboard controller (KBC) 305. In addition, a large-capacity storage device is included in place of the HDD 311 in some cases. Furthermore, an internal configuration of the network controller (NIC) 312 varies depending on whether an apparatus including the network controller (NIC) 312 is adapted to a wired local area network (LAN) or a wireless LAN, or adapted to both of these. Nevertheless, such a difference in internal configuration is hidden inside the network controller (NIC) 312, and the system can be controlled assuming that the network controller (NIC) 312 is equivalent for the other modules illustrated in FIG. 3 in any case.

FIG. 4 is a diagram illustrating programs of the image forming apparatus 104. These programs are stored in the ROM 207, and read out and executed by the controller unit 205 of the image forming apparatus 104.

A bootloader 401 includes a program to be executed immediate after the power of the image forming apparatus 104 is turned on. The program includes a program for executing various boot sequences required for starting up a system.

An operating system 402 is a program intended to provide an execution environment of various programs for implementing functions of the image forming apparatus 104. The operating system 402 mainly provides functions of resource management of memories of the image forming apparatus 104 (i.e., the ROM 207, the RAM 208, and the HDD 209), and basic input-output control of each of the other components illustrated in FIG. 2.

A network control program 403 is a program to be executed when data is transmitted to or received from a device connected via a network. The program is used for executing various types of processing such as receiving processing of a file to be printed, data transmission from an external apparatus, transmission and reception of commands, and transmission of digital data generated through inspection conducted by the inspection unit 214. The network control program 403 includes a driver program for controlling the external I/F unit 202.

A first receiving program 404 is a program for receiving various instructions and information from the information processing apparatus 102. Information and instructions to be received using the program include the designation of image information to be inspected by the inspection unit 214.

A first transmission program 405 is a program for transmitting information to the information processing apparatus 102. Information to be transmitted using the program includes inspection result data generated through inspection conducted by the inspection unit 214.

A JDF function program 406 is a program for executing a JDF print function to be executed by the controller unit 205 in accordance with an instruction from the external I/F unit 202 when JDF job data is received by the image forming apparatus 104 via the external I/F unit 202. By the JDF print function, the controller unit 205 sequentially instructs the devices illustrated in FIG. 2 to execute operations in an appropriate order based on a processing order and a processing condition described in the program. Control is performed in such a manner that JDF print processing is finally executed as a result of the operations. The devices include the sheet processing apparatus 210, the printer unit 203, the HDD 209, the compression/decompression unit 206, and the RAM 208. In addition, processing to be executed by the JDF function program 406 also includes analysis processing of JDF job data received via the external I/F unit 202, determination processing of determining whether JDF job data includes an inappropriate setting, based on a result of the analysis processing, and program processing of performing a setting change for cancelling the inappropriate setting.

A PDF function program 407 executes rasterizing processing of PDF data and a print function that are to be executed by the controller unit 205, if PDF data (print target image data) is received by the image forming apparatus 104 via the external I/F unit 202. By the PDF function to be performed by the controller unit 205, the controller unit 205 sequentially instructs the devices illustrated in FIG. 2 to execute operations in an appropriate order based on a processing order and a processing condition described in the program. Control is performed in such a manner that PDF print processing is finally executed as a result of the operations. These devices include the sheet processing apparatus 210, the printer unit 203, the HDD 209, the compression/decompression unit 206, and the RAM 208. In addition, the PDF function program 407 according to the present exemplary embodiment is configured to operate together with the JDF function program 406 as various designations made at the time of execution of print processing.

A media management program 408 is a program for executing a management function related to sheets usable by the image forming apparatus 104. Sheet related information to be managed by the program is stored in the HDD 209.

A sheet count program 409 is a program for totalizing, managing, and storing, in association with size information of sheets, the number of sheets used in printing executed when the printer unit 203 forms images onto sheets stored in the sheet feeding unit 212 included in the image forming apparatus 104.

An inspection program 410 is a program for controlling the inspection unit 214 to inspect an output image, and generating inspection result data. The inspection result data generated using the program is transmitted to the information processing apparatus 102 using the first transmission program 405.

FIG. 5 exemplarily illustrates a configuration of programs included in the information processing apparatus 102 in the printing business operator system 100.

A bootloader 501 includes program to be executed immediate after the power of the information processing apparatus 102 is turned on. The programs include a program for executing various boot sequences required for starting up a system.

An operating system 502 is a program intended to provide an execution environment of various programs for implementing functions of the information processing apparatus 102. The operating system 502 provides the function of resource management of memories of the information processing apparatus 102 (i.e., the ROM 303, the RAM 302, and the HDD 311).

A network control program 503 is a program to be executed when data is transmitted to or received from a device connected via a network. More specifically, the program is used when print job data is transmitted to the image forming apparatus 103 or 104, and a print processing instruction is issued. The program is also used when the laminating machine 105 is instructed to execute decoration processing on a printed product. Furthermore, the program is also used when the adhesive binding machine 106 is instructed to execute postprocessing on products. The program is also used when an inspection instruction is issued to the inspection unit 214 of the image forming apparatus 103 or 104 via the first receiving program 404. The program is also used when quality report data is received from the inspection unit 214 via the first transmission program 405.

A web server 504 is a server program for causing an external device connected via a network, to use a web service. Various services are considered to be provided by the web server 504. Nevertheless, in the present exemplary embodiment, the description will be given of an example case where the web server 504 is used as a unit for inputting order target data to the printing business operator system 100 from the orderer system 109. In addition, the description will also be given of an example case where the web server 504 is also used as a unit for acquiring PQX information being a quality report for checking whether a product satisfies quality requirement set by an orderer for a printing business operator when data is input.

A workflow control program 505 is a program for executing centralized management of job execution, and processing and control to be performed between devices connected via the network 101 in the printing business operator system 100. The workflow control program 505 plays a key part of the printing business operator system 100. When a product is to be manufactured using a plurality of processes (i.e., a plurality of apparatuses), the workflow control program 505 controls an execution order of the processes and the execution of jobs. The workflow control program 505 also controls the selection and switching of an apparatus to be used, and recovery production. The workflow control program 505 also executes processing of issuing various instructions to an operator working in the printing business operator system 100. Furthermore, the workflow control program 505 according to the present exemplary embodiment also provides a PQX creation unit for receiving measurement data regarding the quality of a printed image from the inspection unit 214 of the image forming apparatus 104, and converting the measurement data into data in a PQX format.

A data input system program 506 is software playing a role for mainly storing and managing, in the printing business operator system 100, data ordered by the orderer system 109 to be produced. The data input system program 506 also serves as a system used for electronically executing various functions required for service related to order reception and placement, between the orderer system 109 and the printing business operator system 100 in cooperation with the web server 504. Examples of the functions include a function of performing a series of processes such as data transmission and issuance of invoices. An arbitrary communication specification can be used for communication between the orderer system 109 and the printing business operator system 100. A system that supports PrintTalk is widely known as a standard technique.

A second receiving program 507 is a program for receiving PRX being quality request data, among pieces of data input from the orderer system 109. If the program receives PRX, content of the PRX is analyzed. The second receiving program 507 provides instructions and conditions for creating a product with quality requested by an orderer, by appropriately making necessary settings in apparatuses in the printing business operator system 100 via the workflow control program 505, or presenting necessary information to an operator.

In the present exemplary embodiment, the description will be given of an example case where the printing business operator system 100 receives quality request data from the orderer system 109 via the web server 504, and then the second receiving program 507 receives the received data. Nevertheless, as another configuration, the second receiving program 507 may directly receive quality request data from the orderer system 109. Alternatively, the second receiving program 507 may be configured to operate on the web server 504 as a web content.

A second transmission program 508 is a program for transmitting PQX being quality report data to the orderer system 109 or acquiring the PQX for determining whether a printing business operator makes a quality condition designated by PRX being quality request data, at the time of production. The second transmission program 508 is configured to receive and accumulate inspection result data from the image forming apparatus 103 or 104, or another apparatus in the printing business operator system 100, convert the inspection result data into data in a PQX format at an appropriate timing, and enable the orderer system 109 to receive PQX via a communication unit.

In the present exemplary embodiment, when the orderer system 109 receives quality report data from the printing business operator system 100, a request is received via the web server 504. Then, via the second transmission program 508, quality report data is transmitted as a response to the received request. Nevertheless, as another configuration, the second transmission program 508 may directly transmit quality report data to the orderer system 109. Alternatively, the second transmission program 508 may be configured to operate on the web server 504 as a web content.

FIG. 6 exemplarily illustrates a configuration of programs included in the information processing apparatus 110 in the orderer system 109.

A bootloader 601 includes programs to be executed immediate after the power of the information processing apparatus 110 is turned on. The programs include a program for executing various boot sequences required for starting up a system.

An operating system 602 is a program intended to provide an execution environment of various programs for implementing functions of the information processing apparatus 110. The operating system 602 provides the function of resource management of memories of the information processing apparatus 110 (i.e., the ROM 303, the RAM 302, and the HDD 311).

A network control program 603 is a program to be executed when data is transmitted to or received from a device connected via a network. More specifically, the program is used when data transmission and reception are executed with the printing business operator system 100 via the internet 108. The program is also used at the time of rendering display processing or data transmission/reception processing to be executed using a web browser 604 to be described below.

The web browser 604 is a client program for using a web service provided by an external system connected via a network. Various services are considered to be used by the web browser 604. In the present exemplary embodiment, the web browser 604 is used as a unit for issuing an input request of data to be ordered, to the printing business operator system 100. In addition, the web browser 604 is also used as a unit for acquiring PQX information being a quality report for checking whether a product satisfies quality requirement set by an orderer for a printing business operator when data is input.

A PDF creation program 605 is a program for creating image data in a PDF that is to be ordered by the orderer system 109 to be produced by the printing business operator system 100. In the present exemplary embodiment, the description will be given of an example in which a PDF is used as a format of image data, but another format may be used. The creation of PDF data also includes processing of adding an image to existing PDF image data.

A PRX creation program 606 is a program for creating information for conveying a quality request item of a product to be produced, in a PRX format, when a production order is placed by the orderer system 109 with the printing business operator system 100. Specific content of a quality request designated by the program, a setting method thereof, and a created data format will be described below.

A JDF creation program 607 is a program for creating information for conveying a configuration of a product to be produced, and a job execution condition and a job setting to be set for the production, in a JDF format, when a production order is placed by the orderer system 109 with the printing business operator system 100. Specific content of setting information designated by the program, a setting method thereof, and a created data format will be described below.

A third transmission program 608 is a program used for transmitting quality request data in a PRX format that has been created by the PRX creation program 606, from the orderer system 109 to the printing business operator system 100.

A third receiving program 609 is a program used for the orderer system 109 receiving quality report data in a PQX format that has been created by the second transmission program 508 in the printing business operator system 100.

Figure 7:
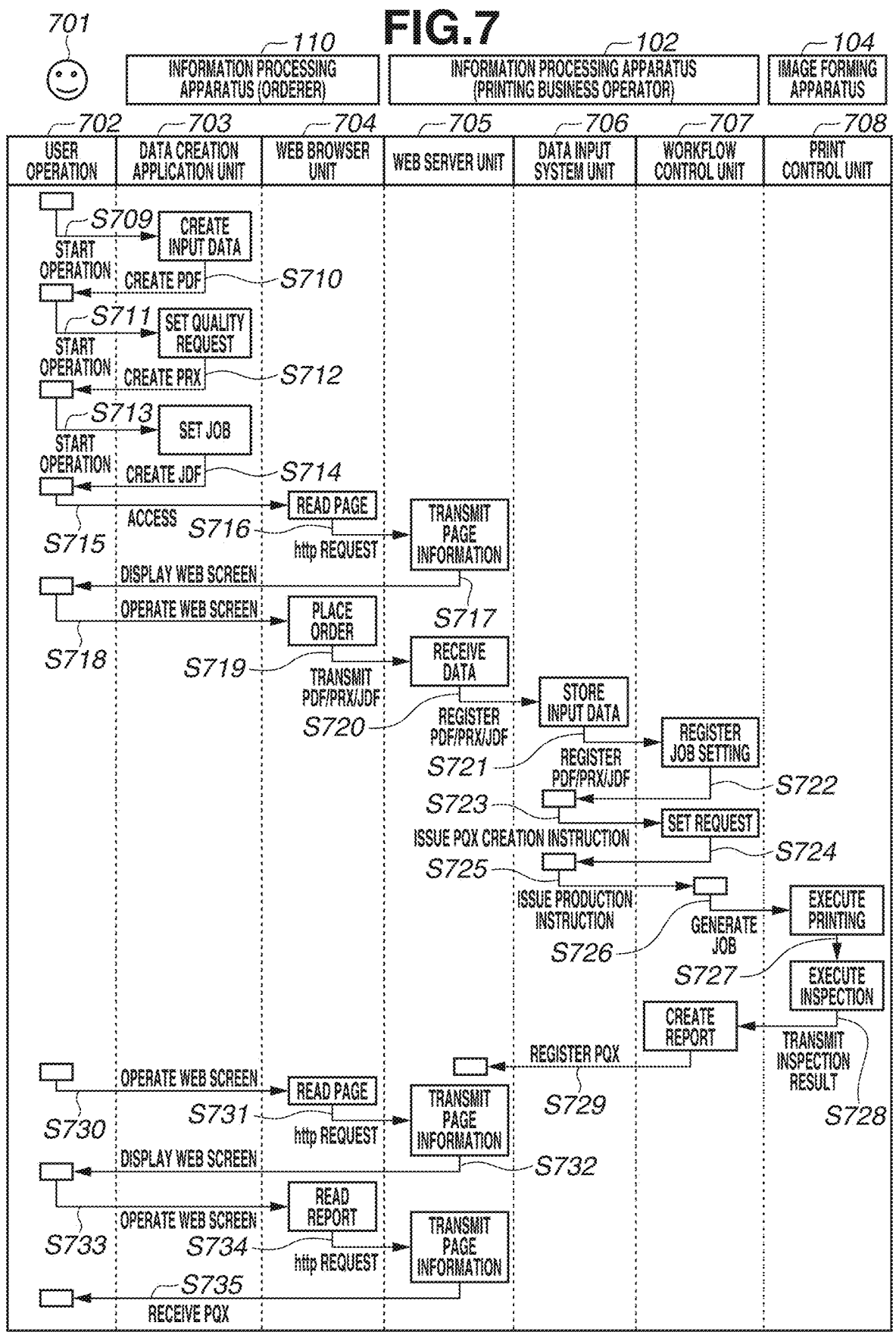
FIG. 7 illustrates a system flow for illustrating a processing flow of the entire print processing system according to an exemplary embodiment.

FIG. 7 is a system flowchart illustrating processing executed when the orderer system 109 and the printing business operator system 100, and an orderer (i.e., user) serving as an operator of these systems use functions provided by a system. A user 701 refers to a user of the information processing apparatus 110 in the orderer system 109.

Hereinafter, the description will be given of a flow of control executed between systems during the execution of an operation 702 executed when functions provided by the systems are provided to the user 701, in the respective systems of the user 701, the information processing apparatuses 110 and 102, and the image forming apparatus 104. Nevertheless, if a plurality of subsystems needs to perform processing while interacting with one another in each system, a flow will be described in terms of these subsystems. A subsystem of the user 701 corresponds to a user operation 702.

The information processing apparatus 110 of the orderer system 109 is broken down into two subsystems. More specifically, the information processing apparatus 110 is broken down into two subsystems corresponding to a data creation application unit 703 and a web browser unit 704.

The data creation application unit 703 is implemented by the CPU 301 executing the PDF creation program 605, the PRX creation program 606, and the JDF creation program 607. The web browser unit 704 is implemented by the CPU 301 executing the web browser 604.

The information processing apparatus 102 of the printing business operator system 100 is broken down into three subsystems. More specifically, the information processing apparatus 102 is broken down into three subsystems corresponding to a web server unit 705, a data input system unit 706, and a workflow control unit 707.

The web server unit 705 is implemented by the CPU 301 executing the web server 504. The data input system unit 706 is implemented by the CPU 301 executing the data input system program 506. The workflow control unit 707 is implemented by the CPU 301 executing the workflow control program 505.

In step S709, the user issues a creation instruction of data to be targeted by an order to be placed with the printing business operator system 100. Specifically, the PDF creation program 605 receives an operation performed in accordance with the instruction issued in step S709, and various types of processing for creating desired PDF image data are executed.

If the creation of desired PDF image data is completed in step S710, then in step S711, the user further issues a creation instruction of quality request data for a product ordered to be produced by the printing business operator system 100. Specifically, the PRX creation program 606 receives an operation performed in accordance with the instruction issued in step S711, and various types of processing for creating desired PRX data are executed.

If the creation work of desired PRX data is completed in step S712, then in step S713, the user further issues a creation instruction of a job ticket for a product ordered to be produced by the printing business operator system 100. Specifically, the JDF creation program 607 receives an operation performed in accordance with the instruction issued in step S713, and various types of processing for creating desired JDF data are executed.

Because the creation of all pieces of data to be input to a printing business operator is completed when the creation of desired JDF data is completed in step S714, from next step, the processing proceeds to data input processing to the printing business operator.

In step S715, the user operates the web browser unit 704, and performs an operation necessary for displaying an operation screen for inputting data to the printing business operator. More specifically, in step S716, the web browser unit 704 outputs a hypertext transfer protocol (http) request necessary for rendering processing, to the web server unit 705 operating on the information processing apparatus 102 of the printing business operator, based on a uniform resource locator (URL) information input in step S715. In step S717, the web server unit 705 returns page information as a response to the received request.

In step S718, the user operates a displayed data input screen and issues an execution instruction of order placement processing on the web browser unit 704.

In response to the processing performed in step S718, in step S719, the web browser unit 704 transmits input data (i.e., PDF data, PRX data, JDF data) to the web server unit 705. When the web server unit 705 receives the input data, in step S720, the web server unit 705 executes processing of storing each of the input data into the data input system unit 706.

Step S721 and subsequent steps correspond to steps of production processing of input data to be executed in the printing business operator system 100. More specifically, job data is registered into the workflow control unit 707 based on the input data, and a print job is generated in the printing business operator system 100. In addition, in the system according to the present exemplary embodiment, it is necessary to create and transmit PQX being a quality report suitable for designated PRX. For this reason, if job registration processing ends in step S722, then in step S723, the data input system unit 706 issues a PQX creation instruction to the workflow control unit 707.

In step S724, all preparations for starting production is completed when the above-described step ends. Thus, in step S725, the data input system unit 706 issues a production start instruction (i.e., job execution instruction) to the workflow control unit 707. In step S726, the workflow control unit 707 generates a print job and transmits the print job to a print control unit 708 included in the image forming apparatus 104.

In response to the instruction issued in step S726, the print control unit 708 starts print processing. Then, in step S727, the inspection unit 214 included in the image forming apparatus 104 executes inspection of the produced product. In step S728, the print control unit 708 returns the inspection result to the workflow control unit 707. In step S729, the workflow control unit 707 converts the returned inspection result into data in a PQX format, and stores the data into the web server unit 705.

The above-described operation flows correspond to a series of operation flows related to the production of data input by the orderer system 109 that is performed by the printing business operator system 100, and creation processing of PQX being requested quality report information.

In step S730, for checking a quality status of input data at the time of production, the user executes acquisition processing of PQX data. More specifically, the user accesses the web browser unit 704, and inputs information such as a URL necessary for acquiring information regarding PQX. In step S731, an http request is transmitted from the web browser unit 704 to the web server unit 705. In step S732, corresponding response information is returned. In step S733, the user operates a web screen displayed in accordance with the response information returned in step S732, and instructs the web browser unit 704 to acquire quality report information (i.e., PQX). In response to the instruction, in step S734, an http request is transmitted to the web server unit 705. In step S735, PQX information is transmitted to the user as a response to the http request transmitted in step S734.

Figure 8:
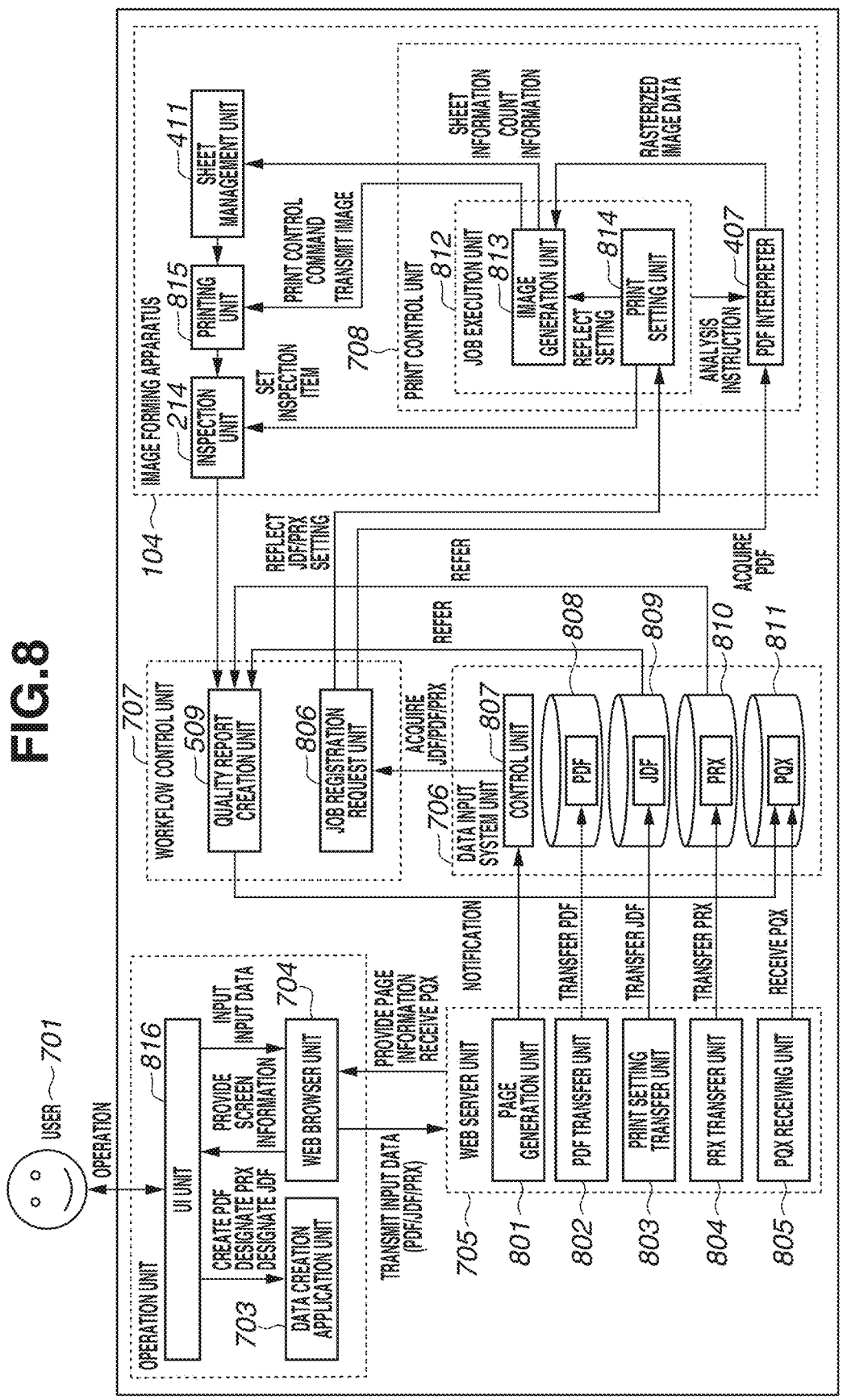
FIG. 8 is a block diagram illustrating a system configuration of the entire print processing system according to an exemplary embodiment.

FIG. 8 is a system configuration diagram illustrating relationships between assigned processes and functions of functional modules, and including the orderer system 109 and the printing business operator system 100 that are included in the system, and a user being an operator thereof. Hereinafter, details of each unit will be described.

A user interface (UI) unit 816 is a functional unit provided for providing display of image information, and a unit for receiving an input-output instruction of data and an operation instruction. An instruction is issued from the UI unit 816 to the data creation application unit 703 and the web browser unit 704.

The data creation application unit 703 is a functional unit for providing the user with a function of creating JDF data, PDF data, and PRX data.

The web browser unit 704 is a functional unit for performing processing of presenting screen information by displaying a web content on a window screen displayed on the UI unit 816. By performing information transmission/reception processing with the web server unit 705 to be described below, the web browser unit 704 executes various types of data processing including presentation of various types of screen information and print target data transfer. The web browser unit 704 provides the user with a series of functions including data input and quality request/report that are to be implemented between the orderer system 109 and the printing business operator system 100.

The web server unit 705 is a functional unit that is included the information processing apparatus 102 of the printing business operator system 100, and provides an external apparatus with a web service. The web server unit 705 executes a series of processes for receiving various requests from an external apparatus, and returning an execution result of processing suitable for the content of the requests, to the external apparatus in the form of page information. A page generation unit 801 plays a role of generating page information in accordance with the content of a request. In addition, the page generation unit 801 can issue an execution instruction of data input processing to a control unit 807 of the data input system unit 706.

A PDF transfer unit 802, a print setting transfer unit 803, and a PRX transfer unit 804 execute processing of transferring PDF data, JDF data, and PRX data being input data that have been transmitted from the web browser unit 704, to the respective storage units 808, 809, and 810 included in the data input system unit 706. In addition, a PQX receiving unit 805 executes processing of receiving PQX data 811 created by a quality report creation unit 509 to be described below.

The data input system unit 706 is a functional unit that is included in the information processing apparatus 102 of the printing business operator system 100, and provides an external apparatus with a service related to data input processing. The control unit 807 requests each piece of input data (PDF 808, JDF 809, PRX 810) from a job registration request unit 806 included in the workflow control unit 707, and issues an execution instruction of a print job to the image forming apparatus 104.

The workflow control unit 707 is a functional unit for providing a workflow function that is included in the information processing apparatus 102 of the printing business operator system 100. Various apparatuses illustrated in FIG. 1 are connected via the network 101 under the control of the workflow control unit 707. Operations of the apparatuses are performed and execution instructions of jobs are issued under the control of the workflow control unit 707. The printing business operator system 100 thereby operates in an integrated manner. The workflow control unit 707 includes the quality report creation unit 509 that generates PQX data being quality report information, from information regarding the quality of a produced product among execution results of jobs operated by the apparatuses in the printing business operator system 100.

The image forming apparatus 104 is broadly divided into the print control unit 708, a sheet management unit 411, a printing unit 815, and the inspection unit 214.

The print control unit 708 further include a job execution unit 812 and a PDF interpreter 407. The job execution unit 812 includes an image generation unit 813 and a print setting unit 814. The print setting unit 814 receives job data (i.e., the JDF 809, the PDF 808, the PRX 810) transmitted from the job registration request unit 806, and instructs the image generation unit 813 to execute image generation processing. At the same time, the print setting unit 814 instructs the PDF interpreter 407 to execute analysis processing of the received PDF 809. In addition, the print setting unit 814 instructs the inspection unit 214 to inspect a produced product for a quality request item requested in the PRX 810. The PDF interpreter 407 transmits intermediate data (not illustrated) generated after analysis, to the image generation unit 813, and the image generation unit 813 executes subsequent image formation processing. More specifically, the image generation unit 813 instructs the sheet management unit 411 to count the size and the type of sheets to be used in print processing, and instructs the printing unit 815 to execute processing of forming an image of the intermediate data (not illustrated) generated after analysis, onto a sheet. Furthermore, the inspection unit 214 executes inspection processing of the image on the sheet that has been generated by the printing unit 815, and registers the inspection result into the quality report creation unit 509.

FIGS. 9A, 9B, and 9C are diagrams illustrating a configuration of an inspection apparatus in the configuration of the image forming apparatus 104, and a method and a structure of inspection to be conducted by the inspection apparatus.

FIG. 9A is a configuration diagram illustrating the arrangement and a connection state of modules included in the image forming apparatus 104, and an order relationship of sheet conveyance paths. A sheet feeding unit 901 is attached adjacently to an image forming unit 902. In addition, an intermediate processing unit 903 is adjacently connected to the image forming unit 902 on the opposite side of the image forming unit 902 with respect to the sheet feeding unit 901. The intermediate processing unit 903 corresponds to an inserter used for inserting an insertion sheet to a specific part of a product being produced, and a cooling device for cooling the heat on a sheet that has been generated when fix processing is performed by the image forming unit 902, for example. An inspection unit 904 is attached on the downstream side of the intermediate processing unit 903. The details of the configuration of the inspection unit 904 will be described below.

A postprocessing unit 905 is further attached to a rear end of the inspection unit 904. In the postprocessing unit 905, binding processing such as stapling, punching processing such as punching, and processing treatment on printed sheets are performed.

The type, the number, and the connection order of the components included in the image forming apparatus 104 illustrated in FIG. 9A are examples, and are not limited to those illustrated in FIG. 9A.

FIG. 9B is a configuration diagram illustrating an internal configuration of the inspection unit 904. A printed sheet is conveyed to a conveyance path 906 from an upstream apparatus of the inspection unit 904. A first inspection unit 907 and a second inspection unit 908 for inspecting image information formed on the conveyed sheet are arranged above and below the sheet. These inspection units are provided for simultaneously inspecting images formed on the front surface and the rear surface of the sheet. The first inspection unit 907 and the second inspection unit 908 according to the present exemplary embodiment include contact image sensors arranged parallel to a main scanning direction with respect to the sheet conveyed on the conveyance path 906. The first inspection unit 907 and the second inspection unit 908 including contact image sensors continuously read the images on the sheet conveyed on the conveyance path 906, in the main scanning direction in accordance with the conveyance speed of the sheet. Then, the first inspection unit 907 and the second inspection unit 908 can highly accurately acquire planar image information formed on the sheet. More specifically, the first inspection unit 907 and the second inspection unit 908 can detect an image defect such as an image positional shift or blotches in image information formed on the sheet, and perform image inspection with respect to reading accuracy of a barcode.

In addition, on the conveyance path 906, a third inspection unit 912 and a fourth inspection unit 913 are further arranged on the downstream side of the first inspection unit 907 and the second inspection unit 908. The third inspection unit 912 and the fourth inspection unit 913 illustrated in the present exemplary embodiment are spectrophotometric colorimeter apparatuses. Similarly to the first inspection unit 907 and the second inspection unit 908, the third inspection unit 912 and the fourth inspection unit 913 are arranged above and below the conveyance path 906 for simultaneously inspecting the front surface and the rear surface of the sheet. The third inspection unit 912 and the fourth inspection unit 913 are intended to highly accurately inspect color information of an image at a specific point on the sheet conveyed on the conveyance path 906.

The sheet having passed through the first to fourth inspection units 907, 908, 912, and 913 is further conveyed in the following two directions in accordance with the arrangement state of a flapper 909. More specifically, the sheet is further conveyed to the postprocessing unit 905 attached to the rear end of the inspection unit 904, via a conveyance path 910. Alternatively, if the conveyed sheet does not constitute a part of a product, and is an auxiliary sheet for test printing that is intended to check tint or an image state, it is inappropriate to mix the sheet into the product. For this reason, the inspection unit 904 can also control the arrangement state of the flapper 909 in such a manner as to guide the sheet to a conveyance path 911 and a discharge tray 914.

FIG. 9C is a diagram illustrating an example of image information on a sheet that is to be used for inspection performed by the first to fourth units 907, 908, 912, and 913 included in the inspection unit 904. Hereinafter, the use application and the purpose of each image element formed on a sheet will be described.

Registration marks 917 are markers for inspecting whether an image is correctly formed at a designated position on a sheet. The image information is read by the first inspection unit 907 and the second inspection unit 908. Even if the registration marks 917 are not included as image information 915 of PDF data input to the image forming apparatus 104 by PRX, the image forming apparatus 104 can perform image formation while superimposing the registration marks 917 onto the PDF data. Alternatively, if second registration marks 918 are preliminarily included in input PDF data as image information, the first inspection unit 907 and the second inspection unit 908 can read the registration marks 918 included in the PDF data.

Color patches 916 correspond to a patch image portion for highly accurately reading color information of an image at a designated position on the sheet by the third inspection unit 912 and the fourth inspection unit 913. Similarly to the registration marks 917, even if the color patches 916 are not included as the image information 915 of PDF data input to the image forming apparatus 104 by PRX, the image forming apparatus 104 can perform image formation while superimposing the color patches 916 onto the PDF data. Alternatively, if a second color patch 919 is preliminarily included in input PDF data as image information, the third inspection unit 912 and the fourth inspection unit 913 can read the second color patch 919 included in the PDF data.

A barcode 920 indicates a region in which a barcode image constituting a part of an image of a product is printed. As illustrated in FIG. 9C, a position of a barcode is designated by designated relative coordinates (X2 (925), Y2 (926)) from origin coordinates 921 of the sheet, and a size 927 of an image. The first inspection unit 907 or the second inspection unit 908 can therefore read and inspect image information of the barcode 920 using a contact image sensor.

An image defect 922 indicates a defect image portion that is not included in the image information 915 of the input PDF data, and generated due to the image forming apparatus 104 or a defect of the sheet. The image defect 922 can also be detected by the first inspection unit 907 and the second inspection unit 908, and the position of the detected defect can be acquired as relative coordinates (X1 (923), Y1 (924)) from the origin coordinates 921.

Figure 10A:
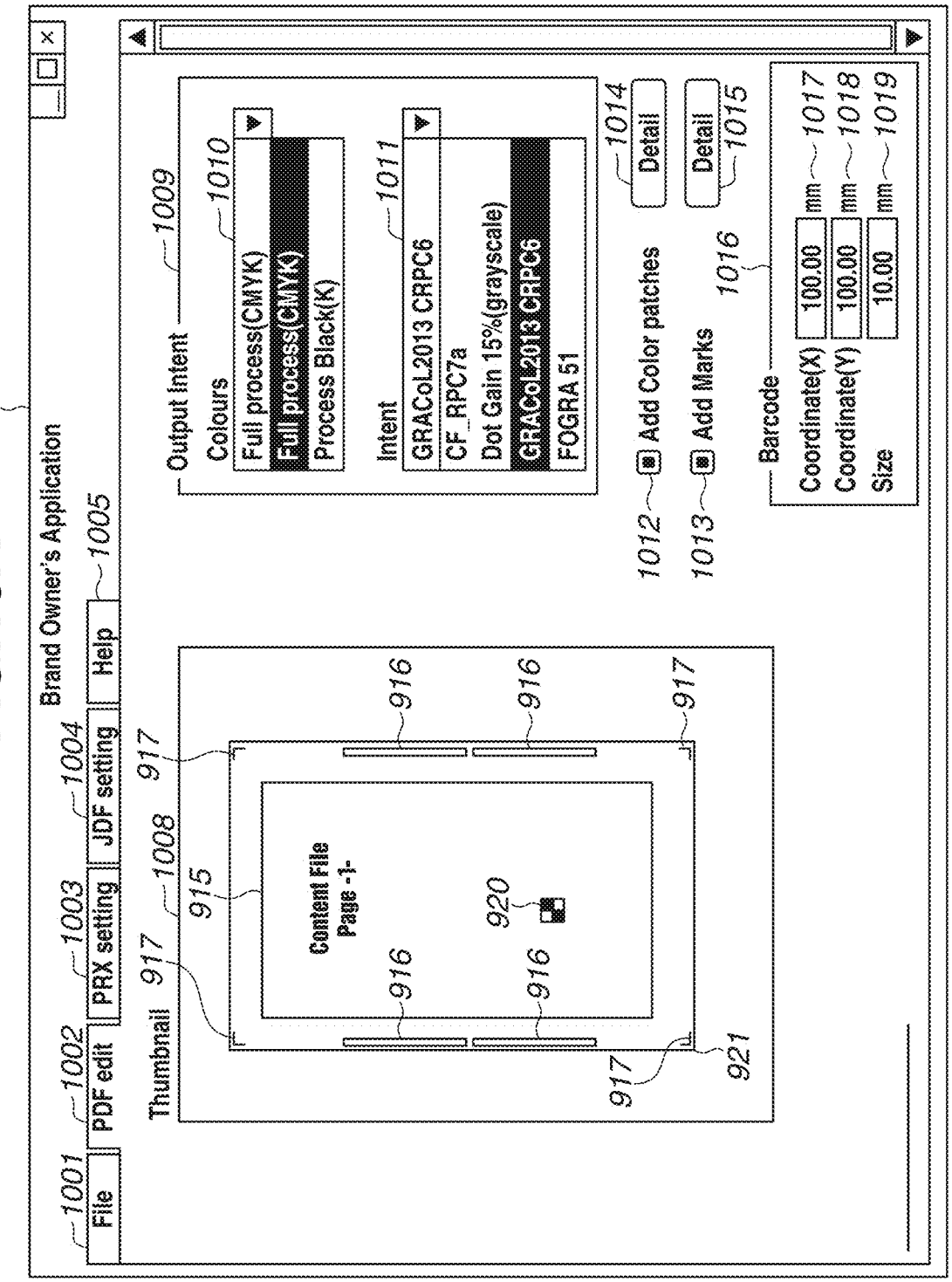
FIG. 10A illustrates a screen example according to an exemplary embodiment.
Figure 10C:
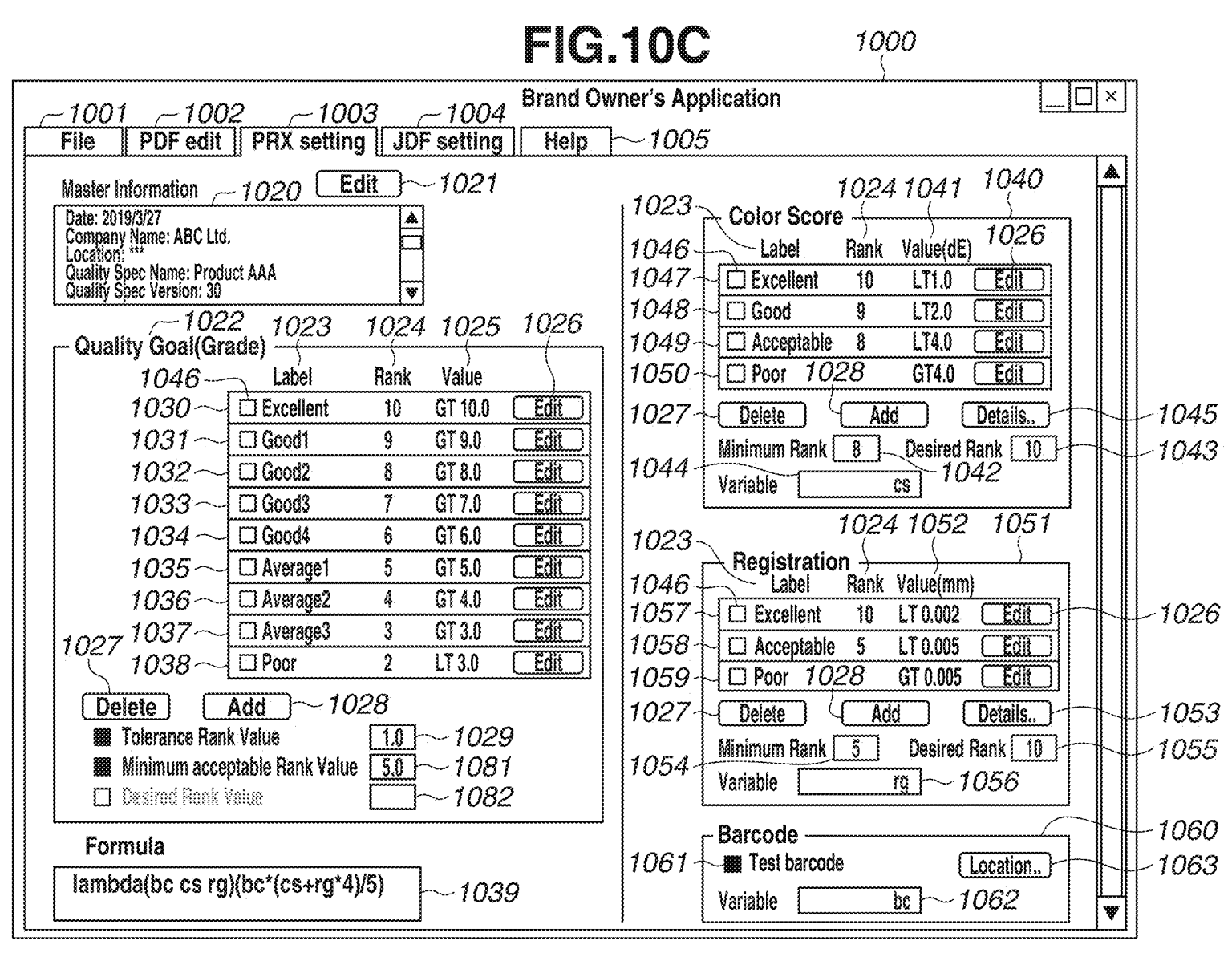

FIGS. 10A to 10C are diagrams each illustrating a configuration of a screen for creating input data to be used by an orderer on the information processing apparatus 110 in the orderer system 109.

FIG. 10A illustrates an example of an application screen for creating or editing PDF data being image data to be input, on the information processing apparatus 110 in the orderer system 109. As an example of an application according to the present exemplary embodiment, FIG. 10A illustrates a configuration in which the same application provides a plurality of application functions with different purposes in parallel, and enables the user to selectively use the application functions via function tabs. The user accordingly uses an application function while switching between a general-purpose function setting unit 1001, a PDF edit unit 1002, a PRX setting unit 1003, a JDF setting unit 1004, and a help function provision unit 1005. Each of these units can be operated by selecting a corresponding tab.

FIG. 10A illustrates an example of a screen in a state in which the PDF edit unit 1002 is selected.

A thumbnail display region 1008 is a reference mage display region for executing various settings while visually checking print target image data by the user of the application illustrated in FIG. 10A. In the thumbnail display region 1008, additional image information such as the registration marks 917, the color patches 916, and the barcode 920 illustrated in FIG. 9C are displayed. The additional image information is required for performing inspection with respect to a quality condition requested in PRX to be described below, in the printing business operator system 100, and generating PQX as the inspection result.

The registration marks 917 are set by a registration mark setting unit 1013. If an instruction to add registration marks to an image is issued by the registration mark setting unit 1013, the registration marks 917 are added to a setting target page of a PDF file. The color patches 916 can be added to a setting target page of a PDF file by a color patch setting unit 1012.

A registration mark detail setting unit 1015 and a color patch detail setting unit 1014 are setting units for setting detailed information such as positions of the color patches 916 and the registration marks 917 to be added to an image. For example, if the registration marks 917 and the color patches 916 are superimposed on the region of the image information 915 of PDF data, an original image cannot be obtained, which is disadvantageous. The application according to the present exemplary embodiment can therefore adjust coordinates of the image positions of the color patches 916 and the registration marks 917 in such a manner that the positions of the color patches 916 and the registration marks 917 do not overlap the region of the image information 915 of PDF data, using the registration mark detail setting unit 1015 and the color patch detail setting unit 1014.

A barcode information designation unit 1016 is a designation unit for designating a position of a barcode image corresponding portion included in the image information 915 of PDF data. More specifically, the barcode information designation unit 1016 includes an X-coordinate input unit 1017 and a Y-coordinate input unit 1018 indicating an arrangement position of a barcode from the origin coordinates 921, and a size information input unit 1019 of a barcode image portion.

An output intent setting unit 1009 is a setting unit of output intent information that is implemented by a PDF edit function. The output intent setting unit 1009 includes an image forming process information setting unit 1010 to be used by the image forming unit 902 to be applied in production, and a color intent setting unit 1011 to be applied to an image to be produced.

FIGS. 10B and 10C each illustrate an example of an application screen for creating or editing PRX being quality request data to be input, on the information processing apparatus 110 in the orderer system 109. The display control of the screen illustrated in FIGS. 10B and 10C is performed by selecting the PRX setting unit 1003.

A master information setting unit 1020 is a setting unit for inputting various types of master information required in creating PRX. The master information corresponds to various types of information such as a date requested by the specification of PRX, company information, and a name added to a request specification defined by the PRX. These pieces of information can be edited by pressing a master information edit unit 1021.

A total quality goal setting unit 1022 is a setting unit for integrating at least one or more different types of quality request items designated by the PRX, and defining a total quality level. The total quality is determined by the following definitions. The total quality is defined by the combination of a label 1023 indicating readable information that is allocated to a quality level, a rank 1024 indicating quantitative numerical information that corresponds to the label 1023, and a value 1025 for defining parameters and a formula for determining the rank 1024.

Specifically, the following detailed description will be given using highest quality 1030 as an example. The label 1023 of the highest quality 1030 is defined as "Excellent". A character string to be applied to the label 1023 can be arbitrarily set by the user (i.e., orderer) who uses the application illustrated in FIGS. 10B and 10C that operates on the information processing apparatus 110 in the orderer system 109. In other words, the label 1023 indicates information provided for enabling an operator to easily identify the defined meaning of a quality level, and has a property different from information used for control.

On the other hand, a value of the rank 1024 of the highest quality 1030 is defined as 10. The value is a numerical value defined by an orderer for quantitatively determining and managing the quality of a product ordered by an orderer to be produced by a printing business operator, and is information intended to be used for control. Nevertheless, a numerical value of the rank 1024 can be arbitrarily defined by an orderer as a quantitative numerical value of the quality of a product for the orderer.

FIGS. 10B and 10C illustrate an example in which the value 1025 for defining the rank 1024 of the highest quality 1030 is "GT 10.0". That is to say, if a numerical value of a quantitative quality index calculated by a formula setting unit 1039 to be described below is 10.0 or more, the value 1025 of the rank 1024 of the highest quality 1030 is calculated to be 10, and the quality of the product is determined to be the highest quality.

Other quality levels 1031 to 1038 are also defined in such a manner that the rank 1024 and label 1023 are uniquely determined by the value 1025 calculated using similar numerical value and formula. The present exemplary embodiment adopts a configuration in which information defined for each quality level can be edited by a quality level edit unit 1026.

The number of quality levels can be arbitrarily set. More specifically, when a level is finely designated as necessary, by pressing a level addition unit 1028, a new quality level can be added to the total quality goal setting unit 1022. In addition, a level with a checkmark 1046 can be deleted using a level deletion unit 1027.

When an orderer issues a quality request to a printing business operator, the orderer defines an acceptance condition of the quality of a product to be produced, by the numerical value of the rank 1024 defined for each quality level. A quality level defined by the total quality goal setting unit 1022 corresponds to a quality request required for each individual product. A tolerable range setting unit 1029 is provided for setting a tolerable range of the value 1025, which is a quantitative index of the quality of a product, and is to be obtained by calculation. More specifically, the tolerable range setting unit 1029 is a setting item related to a tolerable range to be designated by the orderer for the printing business operator for ensuring a quality variation degree as consistency and uniformity related to quality of product, for preventing a variation in quality among products to be produced. While a quality level defined by the total quality goal setting unit 1022 corresponds to a quality request required for each individual product, a quality level defined by the tolerable range setting unit 1029 corresponds to a tolerable variation in quality among a plurality of products.

A minimum quality request designation unit 1081 designates a minimum quality request of a product. A quality request of a product satisfying a numerical value (5.0 in the example in FIG. 10C) of the minimum standard designated by the minimum quality request designation unit 1081 is designated. Specifically, if a numerical value of the minimum standard is 5.0, a product of which a value of the value 1025 is 4.0 does not satisfy desired quality, and a product of which a value of the value 1025 is 5.2 satisfies the desired quality.

A desired quality request designation unit 1082 designates a desired quality request of a product. For example, the desired quality request designation unit 1082 designates a quality request desired by an order acceptor as desirable.

If the tolerable range setting unit 1029 and/or the minimum quality request designation unit 1081 are/is designated, it is demanded to satisfy these designated values. Nevertheless, because the desired quality request designation unit

1082 designates a quality request desired by an order acceptor as desirable, an inspection side defines quality desired as desirable.

FIG. 10B illustrates an example in which the tolerable range setting unit 1029 designates a quality level, and FIG. 10C illustrates an example in which the tolerable range setting unit 1029 and the minimum quality request designation unit 1081 designate quality levels.

A color quality setting unit 1040 is a setting unit for inputting quality request information regarding the color of a product in creating PRX. Similarly to the total quality goal setting unit 1022, the level of a quality request regarding color can be designated by units for setting the label 1023 and the rank 1024.

A color quality value 1041 is defined based on a color difference (ΔE, will also be referred to as delta E) of a color value being a colorimetric result of a product with respect to requested color. More specifically, FIGS. 10B and 10C illustrate an example in which a color difference of highest quality 1047 in color quality is 1.0 or less. That is to say, FIGS. 10B and 10C illustrate an example case where the label 1023 of the highest quality 1047 is "Excellent", and the rank 1024 is 10. Similarly, FIGS. 10B and 10C illustrate an example in which the rank 1024 and the color quality value 1041 are similarly defined for "good" 1048, "acceptable" 1049, and "poor" 1050 in color quality. Because an addition function and a deletion function of a rank are implemented by structures similar to those of the total quality goal setting unit 1022, the description will be omitted.

Also in the color quality setting unit 1040, when an orderer issues a quality request regarding color to a printing business operator, the orderer defines an acceptance condition of the color quality of a product to be produced, by the numerical value of the rank 1024 defined for each quality level. An acceptance condition is defined by a minimum acceptable color quality setting unit 1042 regarding color quality and a desired color quality setting unit 1043.

By the minimum acceptable color quality setting unit 1042, an orderer defines acceptable color quality (i.e., a minimum value of the rank 1024) for a printing business operator for delivering a product. In other words, it is possible to convey that a product with a numerical value of the rank 1024 that falls below a numerical value (8 in the example in FIGS. 10B and 10C) defined by the minimum acceptable color quality setting unit 1042 does not satisfy acceptable color quality, to the printing business operator as a color quality request item.

By the desired color quality setting unit 1043, an orderer defines a desired color quality condition (i.e., a minimum value of the rank 1024) for a printing business operator for delivering a product. In other words, it is possible to convey a product with a numerical value (10 in the example in FIGS. 10B and 10C) of the rank 1024 that is defined by the desired color quality setting unit 1043, to the printing business operator as a color quality request item.

A color quality variable setting unit 1044 is a unit provided for defining a variable for citing a value of the rank 1024 regarding the above-described color quality, from the formula setting unit 1039 for calculating the value 1025 in the total quality goal setting unit 1022. The formula setting unit 1039 will be described below. In the present exemplary embodiment, FIGS. 10B and 10C illustrate an example in which the color quality variable setting unit 1044 can refer to the value of the rank 1024 regarding color quality, using a variable "cs".

An image positional shift quality setting unit 1051 is a setting unit for inputting quality request information regarding an image positional shift of a product, in creating PRX. Similarly to the total quality goal setting unit 1022, the image positional shift quality setting unit 1051 is configured to designate a level of a quality request regarding an image positional shift, by units for setting the label 1023 and the rank 1024.

An image positional shift quality value 1052 is defined based on a shift amount (length or a distance between a reference image and an image of a product) from a reference position being a measurement result of a product with respect to a requested image positional shift. More specifically, FIGS. 10B and 10C illustrate an example in which a shift amount of highest quality 1057 in image positional shift quality is 0.002 mm or less. That is to say, FIGS. 10B and 10C illustrate an example case where the label 1023 of the highest quality 1057 is "Excellent" and the rank 1024 is 10. Similarly, FIGS. 10B and 10C illustrate an example in which the rank 1024 and the image positional shift quality value 1052 are similarly defined for "acceptable" 1058 and "poor" 1059 in in image positional shift quality. Because an addition function and a deletion function of a rank are implemented by structures similar to those of the total quality goal setting unit 1022, the description will be omitted.

Also in the image positional shift quality setting unit 1051, when an orderer issues a quality request regarding an image positional shift to a printing business operator, the orderer defines an acceptance condition of the image positional shift quality of a product, by the numerical value of the rank 1024 defined for each quality level. An acceptance condition is defined by a minimum acceptable image positional shift quality setting unit 1054 regarding image positional shift quality, and a desired image positional shift quality setting unit 1055.

The minimum acceptable image positional shift quality setting unit 1054 is a setting unit for an orderer defining acceptable image positional shift quality (i.e., a minimum value of the rank 1024) for a printing business operator for delivering a product. It is possible to convey that a product with a numerical value of the rank 1024 that falls below a numerical value (5 in the example in FIGS. 10B and 10C) defined by the minimum acceptable image positional shift quality setting unit 1054 does not satisfy acceptable image positional shift quality, to the printing business operator as an image positional shift quality request item.

The desired image positional shift quality setting unit 1055 is a setting unit for an orderer defining a desired image positional shift quality condition (i.e., a minimum value of the rank 1024) for a printing business operator for delivering a product. It is possible to convey a product with a numerical value of the rank 1024 that exceeds a numerical value (10 in the example in FIGS. 10B and 10C) defined by the desired image positional shift quality setting unit 1055, to the printing business operator as an image positional shift quality request item.

An image positional shift quality variable setting unit 1056 is a setting unit provided for defining a variable for citing a value of the rank 1024 regarding image positional shift quality, from the formula setting unit 1039 for calculating the value 1025 in the total quality goal setting unit 1022. The formula setting unit 1039 will be described below. In the present exemplary embodiment, FIGS. 10B and 10C illustrate an example in which the image positional shift quality variable setting unit 1056 can refer to the value of the rank 1024 regarding image positional shift quality, using a variable "rg".

A barcode reading quality setting unit 1060 is a setting unit for inputting quality request information regarding reading accuracy of a barcode image included in a print target image, in creating PRX. The barcode reading quality setting unit 1060 sets different information from the total quality goal setting unit 1022. Unlike color quality and image positional shift quality, information serving as an index indicating reading quality of a barcode is derived not from a physical amount but from readability or unreadability of barcode information. The executability of inspection of barcode quality is controlled not by the designation of the rank 1024 but by a barcode quality reading instruction setting unit 1061. A barcode position information setting unit 1063 is a setting unit for designating a position in an image of an inspection target barcode, by a coordinate.

A barcode reading quality variable setting unit 1062 is a setting unit for defining a variable for citing an evaluation value regarding barcode reading quality, from the formula setting unit 1039 for calculating the value 1025 in the total quality goal setting unit 1022. The barcode reading quality setting unit 1060 can refer to an evaluation value regarding barcode reading quality, using a variable "bc". In this example, calculation is performed assuming that an evaluation value of barcode reading quality is 1 when a barcode is readable, and an evaluation value of barcode reading quality is 0 when a barcode is unreadable.

The formula setting unit 1039 is a setting unit for defining a formula for deriving the total quality goal setting unit 1022 by integrating inspection results of the color quality setting unit 1040, the image positional shift quality setting unit 1051, and the barcode reading quality setting unit 1060, which have been described above. Specifically, the formula setting unit 1039 stores a formula for deriving numerical values of the values 1025 in the total quality goal setting unit 1022, from values stored as variables of the color quality variable setting unit 1044, the image positional shift quality variable setting unit 1056, and the barcode reading quality variable setting unit 1062.

Various methods can be applied as a method of representing a formula. In this example, a calculating formula is represented by a lambda expression. As another configuration, an unnamed function is represented by a format of an arbitrary programming language or script language. Alternatively, the calculating formula needs not be limited to a mathematical scheme. A programming language or a script language may be directly described, and the application program may obtain a resultant value by executing the programming language or the script language. Furthermore, there is another method of defining a formula by another unit, allocating a name to the formula, and setting the name in the formula setting unit 1039.

Hereinafter, details of processing to be executed for deriving the value 1025 in the total quality goal setting unit 1022 by the formula setting unit 1039 will be described using a specific example.

For example, based on references set in the PRX in accordance with inspection results of the color quality setting unit 1040, the image positional shift quality setting unit 1051, and the barcode reading quality setting unit 1060, quality data included in the created PQX is as follows. Creation processing of the PQX will be described below.

Example

Color quality measurement value (delta E): 1.5 (cs=9)

Image positional shift quality measurement value (mm): 0.002 (rg=10)

Barcode reading quality measurement value (reading success/failure): success (bc=1)

By applying the above-described values to a formula set by the formula setting unit 1039 according to the present exemplary embodiment of the present invention, an evaluation value is calculated as follows.

$$bc * (cs + rg * 4)/5 = 1 * (9 + 10 * 4)/5 = 9.8$$

That is to say, the value 1025 in the total quality goal setting unit 1022 becomes 9.8, and the rank 1024 accordingly becomes 9. In other words, the rank 1031 with the label 1023 indicating "Good1" is derived.

FIGS. 12A, 12B, 12C, and 12D are diagrams each illustrating an example of various types of input target data generated as a result of input performed by an orderer. Hereinafter, the detail will be described for each data type.

FIG. 12A illustrates an example of a job ticket in a JDF format that has been generated by a unit for creating or editing JDF data being a job ticket being input target print setting information, on the information processing apparatus 110 in the orderer system 109.

The job ticket includes the following information. More specifically, the job ticket includes the number of pages 1201 included in a copy, a job total printing parameter 1202, and job partial printing parameters 1206 and 1208.

The job total printing parameter 1202 includes a total number of copies 1203, information regarding a lot 1293, and a media setting 1204 to be used in the entire job. The lot 1293 is a unit of a commodity amount by which a printing business operator delivers produced products to an orderer. The example illustrated in FIG. 12A indicates a state in which an instruction to transmit and deliver products including 13 pages to an orderer from a printing business operator for each set of 1000 copies has been issued. The job partial printing parameters 1206 and 1208 include page range information pieces 1205 and 1209 designated as a part, and media settings 1207 and 1210 to be used in a part.

Actual setting content of the media setting 1204 to be used in the entire job, and the media settings 1207 and 1210 to be used in a part of the job is defined in media tags 1211, 1214, and 1217. The media tags 1211, 1214, and 1217 further include setting information such as media types 1213, 1216, and 1219 and media sizes 1212, 1215, and 1218.

FIGS. 12B1 and 12B2 illustrate an example of PRX data generated by a unit for creating or editing PRX being input target quality request data, on the information processing apparatus 110 in the orderer system 109 (i.e., the screen in FIG. 10B). The PRX data includes the following information. More specifically, the PRX data includes master information 1220 and total quality goal setting information 1221.

The total quality goal setting information 1221 further includes definition units 1222, 1223, 1224, 1225, 1226, 1227, 1228, 1229, and 1230 of the respective quality levels, a formula definition unit 1232, and a tolerable range information setting unit 1231. The tolerable range information setting unit 1231 corresponds to a tolerable variation in quality among a plurality of products.

Because the meaning of information equivalent to these has been described with reference to FIG. 10B, the description will be omitted.

A color quality information definition unit 1233 includes information storing various types of setting information regarding the color quality of a product. More specifically, a unit information definition unit 1235 for defining a color difference being color quality, a reference color information definition unit 1234 being reference color information, and definition units 1236, 1237, 1238, and 1239 of the respective color quality levels are included. In addition, minimum acceptable color quality setting information 1240, desired color quality setting information 1241, color quality variable setting information 1242, and color quality measurement coordinate information 1243 are also included. Because the meaning of information equivalent to these has been described with reference to FIG. 10B, the description will be omitted.

An image positional shift quality information definition unit 1244 includes information storing various types of setting information regarding image positional shift quality of a product. More specifically, a unit information definition unit 1245 for defining a shift tolerable amount being image positional shift quality, and definition units 1246, 1247, and 1248 of the respective image positional shift quality levels are included. In addition, minimum acceptable color image positional shift setting information 1249, desired image positional shift quality setting information 1250, image positional shift quality variable setting information 1251, and image positional shift quality measurement coordinate information 1252 are also included. Because the meaning of information equivalent to these has been described with reference to FIG. 10B, the description will be omitted.

A barcode reading quality definition unit 1253 is provided for storing quality request information regarding reading accuracy of a barcode image included in a product. Barcode reading quality information definition units 1254 and 1255, a barcode reading quality variable definition unit 1258, a barcode reading minimum quality definition unit 1256, a barcode reading desired quality definition unit 1257, and a barcode reading target coordinate definition unit 1259 are included. Because the meaning of information equivalent to these has been described with reference to FIG. 10B, the description will be omitted.

A reference color detailed information definition unit 1260 is provided for defining reference data (correct value, reference value) desired as color quality. As a specific example according to the present exemplary embodiment, a color exchange format (CXF) information definition unit 1261, and an optical spectrum information storage unit 1262 being one of representation units of color information included therein are included.

FIG. 12C illustrates an example of inspection result data obtained when inspection is executed on image information formed on a sheet being a product, by the inspection unit 214 included in the image forming apparatus 104. Information illustrated in FIG. 12C is created by the controller unit 205 executing the inspection program 410 included in the image forming apparatus 104, and transmitted to the workflow control program 505 operating on the information processing apparatus 102. Hereinafter, information included in inspection result data will be described.

Inspection execution sheet information 1263 is provided for the purpose of storing information regarding a position of a sheet from the beginning of a job when the inspection unit 214 of the image forming apparatus 104 executes inspection.

Optical spectrum data 1264 is numerical data of an optical spectrum being color information of an image on a sheet that is obtained by the third inspection unit 912 and the fourth inspection unit 913 in the inspection unit 214 that are illustrated in FIGS. 9A to 9C. The optical spectrum data 1264 is stored in PQX data to be described below, and is used for providing an inspection result regarding color quality to an orderer.

Color difference measurement data 1265 stores a color difference between the optical spectrum data 1264 and targeted color in a delta E format. The example illustrated in FIG. 12C illustrates that a measured color difference is +1.9.

Image positional shift inspection result data 1266 is numerical data of a shift amount regarding a positional shift of an image on a sheet that is obtained by the first inspection unit 907 and the second inspection unit 908 in the inspection unit 214 that are illustrated in FIGS. 9A to 9C. The image positional shift inspection result data 1266 is stored in PQX data to be described below, and is used for providing an inspection result regarding image positional shift quality to an orderer.

Barcode reading inspection result data 1267 is data regarding a reading inspection result of a barcode image on a sheet that is obtained by the first inspection unit 907 and the second inspection unit 908 in the inspection unit 214 that are illustrated in FIGS. 9A to 9C. The barcode reading inspection result data 1267 is stored in PQX data to be described below, and is used for providing an inspection result regarding barcode reading quality to an orderer.

FIG. 12D illustrates an example of print quality report data (i.e., PQX data) created by the workflow control program 505 receiving the inspection information illustrated in FIG. 12C that has been created by the inspection unit 214 included in the image forming apparatus 104. Among pieces of information included in the PQX, major information will be described below.

PQX header information 1269 is a storage region of main information to be stored in PQX data.

A work report storage unit 1270 is used for storing a quality inspection result obtained when the image forming apparatus 104 executes processing, and general-purpose information associated with the quality inspection result.

An inspection result storage region 1271 is a storage unit used for the purpose of discriminating results of various inspections regarding product creation quality that have been executed by the inspection unit 214, for each inspection type, and storing the inspection results. Hereinafter, the details of quality inspection results to be stored in the region will be described.

Inspection region identification information 1272 stores position information of quality inspection executed by the inspection unit 214 included in the image forming apparatus 104. An inspection position information unit 1273 on a sheet is included.

A color quality report storage unit 1274 is a region for storing report information regarding color information among pieces of quality report information to be provided by a printing business operator to an orderer with being included in PQX. The information in the region is created based on the optical spectrum data 1264 illustrated in FIG. 12C. More specifically, a reference link 1275 of the optical spectrum data 1264, an optical spectrum data storage unit 1285 to be referred to by the reference link 1275, optical spectrum data 1286, a measurement position designation unit 1276, and a color difference storage unit 1277 correspond to this.

The color quality report storage unit 1274 is used for the following purposes. Delta E information measured by the image forming apparatus 104 or obtained by calculating a color difference (delta E) by comparing data stored in the optical spectrum data storage unit 1285 from PQX received by the third receiving program 609, and the color quality information definition unit 1233 transmitted by the third transmission program 608 as PRX is stored into the color difference storage unit 1277. After that, processing of deriving the rank 1024 from the color quality value 1041 defined by the color quality setting unit 1040 in FIG. 10B is executed, and determination information regarding color quality is derived.

The measurement position designation unit 1276 is information for indicating a position on a sheet on which color quality inspection has been executed. Position information stored in the measurement position designation unit 1276 indicates relative coordinate positions from the origin of the color patches 916 and 919 about which an image is formed in a main-sub coordinate direction, and reading inspection has been executed by the third inspection unit 912 and the fourth inspection unit 913.

An image positional shift quality report storage unit 1278 is a region for storing report information regarding image positional shift information among pieces of quality report information to be provided by a printing business operator to an orderer with being included in PQX. The information in the region is created based on the image positional shift inspection result data 1266 illustrated in FIG. 12C.

The image positional shift quality report storage unit 1278 is used for the following purposes. A shift amount is calculated by comparing data stored in the image positional shift quality report storage unit 1278 from PQX received by the third receiving program 609, and the image positional shift quality information definition unit 1244 transmitted by the third transmission program 608 as PRX. After that, processing of deriving the rank 1024 from the image positional shift quality value 1052 defined by the image positional shift quality setting unit 1051 in FIG. 10B in is executed, and determination information regarding image positional shift quality is derived.

A measurement position designation unit 1281 is information for indicating a position on a sheet on which image positional shift inspection has been executed. Information stored in the measurement position designation unit 1281 indicates relative coordinate positions from the origin of the registration marks 917 and 918 about which an image is formed in the main-sub coordinate direction, and reading inspection has been executed by the first inspection unit 907 and the second inspection unit 908.

A barcode reading quality storage unit 1282 is a region for storing report information regarding barcode reading quality information among pieces of quality report information to be provided by a printing business operator to an orderer with being included in PQX. The information in the region is created based on the barcode reading inspection result data 1267 illustrated in FIG. 12C.

The barcode reading quality storage unit 1282 is used for the following purposes. An inspection result is calculated by comparing data stored in the barcode reading quality storage unit 1282 from PQX received by the third receiving program 609, and the barcode reading quality definition unit 1253 transmitted by the third transmission program 608 as PRX. After that, determination information of an inspection result regarding barcode reading quality defined by the barcode reading quality setting unit 1060 in FIG. 10B is derived.

A measurement position designation unit 1284 is information for indicating a position on a sheet on which barcode reading inspection has been executed. Information stored in the measurement position designation unit 1284 indicates a relative coordinate position from the origin of the barcode 920 about which an image is formed in the main-sub coordinate direction, and reading inspection has been executed by the first inspection unit 907 and the second inspection unit 908.

A product quality tolerance information storage unit 1287 is information provided for storing report information regarding a quality tolerable range. Specifically, the information stored in the product quality tolerance information storage unit 1287 is information indicating whether a product produced based on the tolerable range information setting unit 1231 illustrated in FIG. 12B1 falls within a designated quality tolerable range. Hereinafter, the details of the information stored in the product quality tolerance information storage unit 1287 will be described.

An average value 1288 stores an average value of the values 1025 obtained in the total quality goal setting unit 1022 of a specific number of produced products. The average value 1288 stores a numerical value derived for calculating and obtaining a variation (i.e., deviation) in value 1025 among products, which will be described below.

A product count storage unit 1289 stores a total number of produced products counted from the first product, and an index indicating how manieth product the current report target product is when counted from a production start.

A product value 1290 stores a numerical value of the calculated value 1025 in the total quality goal setting unit 1022 of the product indicated by the product count storage unit 1289.

A product deviation storage unit 1291 stores a deviation value from the average value 1288 of the calculated values 1025 in the total quality goal setting unit 1022 of the product designated by the product count storage unit 1289. A method for obtaining the average value 1288 and a deviation value to be stored in the product deviation storage unit 1291 will be described below.

A product tolerable range determination information storage unit 1292 stores a determination result indicating whether the value falls within a tolerable range. Specifically, the product tolerable range determination information storage unit 1292 stores a determination result indicating whether the calculated value 1025 in the total quality goal setting unit 1022 of the product indicated by the product count storage unit 1289 falls within a tolerable range indicated by the tolerable range information setting unit 1231.

That is to say, for obtaining uniformity and consistency by suppressing a variation among products, a tolerable range can be designated as an index of quality, and it is determined whether the value falls within the tolerable range, as a quality index. By determining information stored in the product tolerable range determination information storage unit 1292, it can be easily determined whether a product belongs to a good product set without variation with ensured uniformity.

The example illustrated in FIG. 12D indicates an example case where it is determined that the value falls within the designated tolerable range. That is to say, the example indicates an example case where it is determined that the product is a product falling within a designated variation range, and is a product with uniformity guaranteed.

FIGS. 13A, 13B, and 13C each illustrate an example of values of products according to an exemplary embodiment.

The description will be given of an example case where 1.0 is designated as a variation range of the value 1025 in the tolerable range setting unit 1029 on the screen illustrated in FIG. 10B.

FIG. 13A is a diagram illustrating an example of a variation state of the value 1025 and a value of the rank 1024 in the total quality goal setting unit 1022 of each individual product when a product 1301 is consecutively produced. In this example, the number of products is set to ten. FIG. 13A illustrates the value 1025 of total quality and a value of the rank 1024 of each of the first to tenth products counted from a product production start. Because a method for deriving the value 1025 from an individual quality request designated by PRX has already been described with reference to FIGS. 10A to 10C, 11A and 11B, and 12A to 12D, the description will be omitted.

FIG. 11A illustrates a result of FIG. 13A as a graph. A left axis of the graph indicates a value of the rank 1024, and a right axis indicates the value 1025. The values 1025 and the ranks 1024 of the respective products are plotted in the graph with filled circle marks and unfilled triangle marks.

As illustrated in FIG. 11A, the first and fifth products have extremely bad or good quality as compared with neighboring products. In other words, these products become a factor for impairing uniformity of quality. The values 1025 of products other than the first or fifth product fall within a fixed numerical value range. That is to say, as for the quality of these products with ensured uniformity that are other than the first and fifth products, a variation is suppressed and uniformity is guaranteed. In addition, an orderer designates 1.0 as a variation range of the value 1025 in the tolerable range setting unit 1029 on the screen illustrated in FIG. 10B. That is to say, a product with the value falling within a tolerable range=1.0 is a desired product, and the designation indicates a desired item regarding the quality requested from a printing business operator as uniformity of quality at the time of production.

FIG. 13C is a diagram illustrating an example of a calculating formula for extracting products with ensured uniformity that are illustrated in FIG. 11A. Various methods are known as a method for selecting data belonging to a uniform numerical value range by excluding a variation from data including a plurality of numerical values. FIG. 13C illustrates an example of these methods.

First of all, an average value of numerical values of the values 1025 of extraction target products is obtained. After that, a difference between the obtained average value and data of the value 1025 of each product is calculated. A difference between an average value and source data is known as a deviation. Whether the deviation falls within a range of plus and minus 0.5 (i.e., range of 1.0), which is a numerical value set as the tolerable range information setting unit 1231, corresponds to a determination condition for determining whether the value falls within the above-described variation range.

FIG. 13B is a diagram illustrating a determination result indicating whether a variation index that is based on the deviation illustrated in FIG. 13C falls within the value of the tolerable range setting unit 1029 being a designated tolerable range. Specifically, FIG. 13B illustrates a deviation 1313 obtained by the formula illustrated in FIG. 13C, and a determination result 1314 indicating whether the value falls within a tolerable range designated by the tolerable range information setting unit 1231. Because an average value 1312 of the values 1025 is 5.2 in the example illustrated in FIG. 13B, the deviation 1313 is obtained from the calculation result illustrated in FIG. 13C, and the determination result 1314 indicating whether the result satisfies the formula illustrated in FIG. 13C is illustrated.

As indicated by the determination result 1314 illustrated in FIG. 13B, a product set with guaranteed uniformity of quality is illustrated as data 1315 falling within the tolerable range designated by the tolerable range information setting unit 1231. That is to say, the product set with guaranteed uniformity of quality as a production condition designated by an orderer for a printing business operator is illustrated.

FIG. 11B illustrates the determination result 1314 illustrated in FIG. 13B, in a graph format. In addition, information for briefly indicating an effect is added to the graph. FIG. 11B illustrates a relationship between the data 1315 falling within the tolerable range designated by the tolerable range information setting unit 1231, and the average value 1312.

As illustrated in FIG. 11B, with respect to a printing business operator, an orderer can designate the tolerable range information setting unit 1231 by PRX for suppressing a variation in quality among products and requesting a quality index of uniformity. Furthermore, the system that receives the PRX can inspect the quality of a product based on the designated tolerable range information setting unit 1231, and execute production in such a manner that the quality falls within the tolerable range designated by the tolerable range information setting unit 1231 at the time of production. Furthermore, it is possible to employ a production structure and execute quality management for preventing the generation of a product with quality falling outside the tolerable range information setting unit 1231 (i.e., the first and fifth products in the example illustrated in FIG. 11B). By determining whether a product is good, by determining whether the quality falls within the tolerable range designated by the tolerable range information setting unit 1231, quality report information of PQX being a report regarding quality is generated and report information is transmitted to an orderer.

FIG. 14 is a flowchart illustrating processing to be performed in a case where the data creation application unit 703 and the web browser unit 704 create and transmits various types of input data as illustrated in FIGS. 12A to 12D, by operating various setting screens illustrated in FIGS. 10A to 10C. The operation illustrated in the flowchart is implemented by the CPU 301 executing the PDF creation program 605, the PRX creation program 606, the JDF creation program 607, the third transmission program 608, and the web browser 604 that are stored in the HDD 311.

In step S1401, as illustrated in FIG. 10B, a setting of quality request data is performed by a unit for creating or editing PRX being input target quality request data in the information processing apparatus 110. Quality request data setting processing to be executed in step S1401 includes designation or non-designation of a tolerable range of the value 1025 with respect to the tolerable range setting unit 1029.

In step S1402, a set of input data including the set and created setting data is transmitted from the orderer system 109 to the printing business operator system 100. The processing in step S1402 corresponds to step S719 illustrated in FIG. 7.

After a transmission instruction is issued in step S1402, processing in step S1403 and subsequent steps is executed.

In step S1403, analysis processing of JDF data is executed among the pieces of data created in step S1401. The analysis processing corresponds to analysis processing of JDF data described in an Extensible Markup Language (XML) format and illustrated in FIG. 12A. In other words, processing of acquiring various types of information regarding job execution conditions and job setting information that are related to product creation and designated by an orderer for a printing business operator is executed.

In step S1404, creation processing of PRX data is executed by converting data into data in a PRX format in accordance with information obtained as an execution result of the processing described above. The processing corresponds to creation processing of PRX data described in an XML format and illustrated in FIGS. 12B1 and 12B2.

In step S1405, it is determined whether a tolerable range setting of the value 1025 is performed in the tolerable range setting unit 1029 illustrated in FIG. 10B, in PRX setting processing of the setting processing performed in step S1401. If it is determined that a result of determination in step S1405 is true (YES in step S1405), the processing proceeds to step S1406. In step S1406, setting information regarding a tolerable value set in the tolerable range information setting unit 1231 illustrated in FIG. 12B1 is added to PRX. In step S1407, a set of input data set or created by the data creation application unit 703 is transmitted from the orderer system 109 to the printing business operator system 100.

Figure 15:
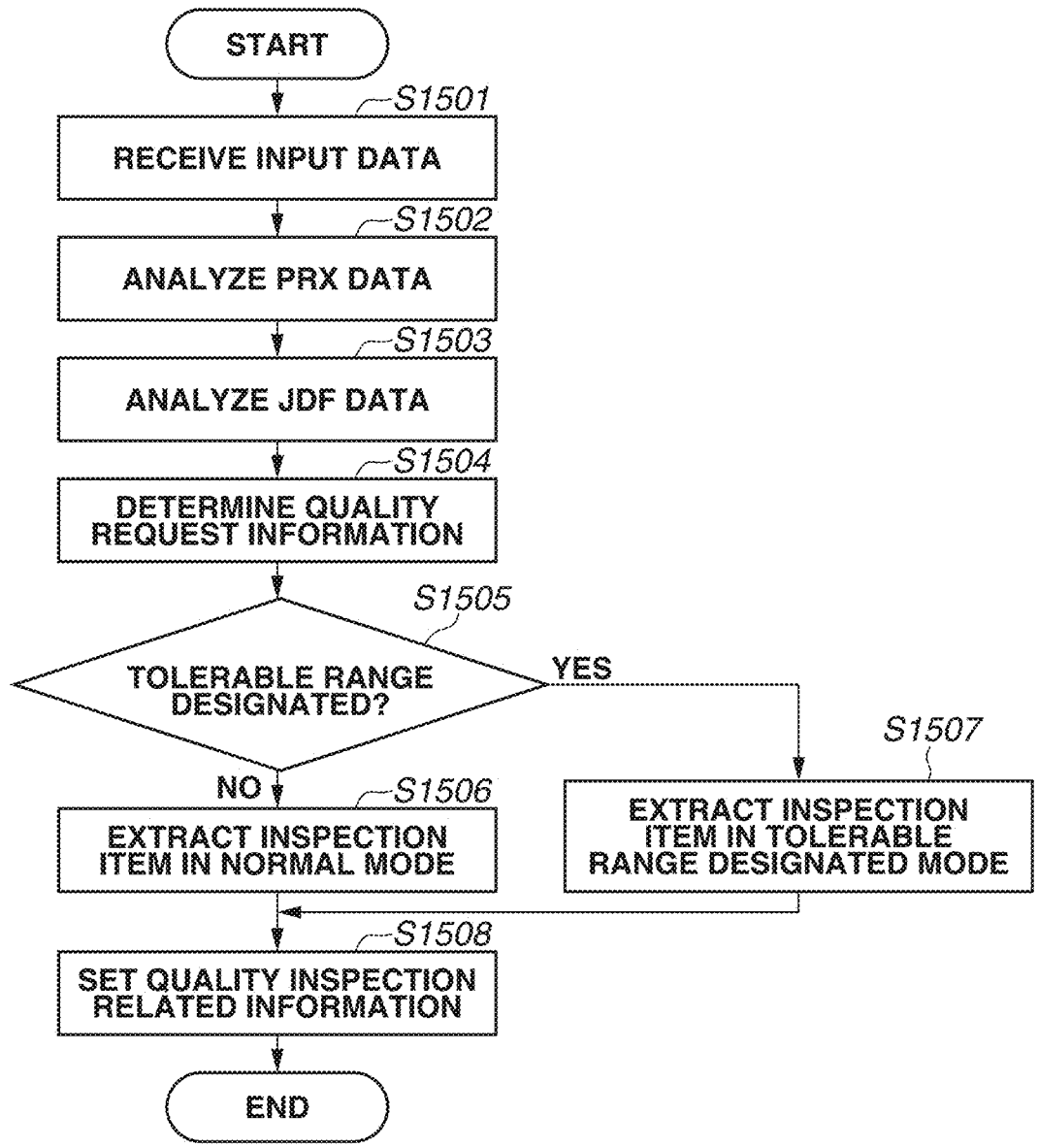
FIG. 15 is a second flowchart illustrating an operation of a workflow control unit according to an exemplary embodiment.

FIG. 15 is a flowchart illustrating a detailed flow in which the workflow control unit 707 analyzes PRX, and executes processing of designating an inspection condition to be used in inspection by the inspection unit of the image forming apparatus 103 or 104, based on input data. An operation illustrated in the flowchart is implemented by the CPU 301 executing the workflow control program 505 stored in the HDD 311.

In step S1501, data is input. In step S1502, analysis processing of PRX data is executed among the data input in step S1501. The analysis processing corresponds to the analysis processing of PRX data described in an XML format and illustrated in FIGS. 12B1 and 12B2. In other words, processing of acquiring various types of information regarding a quality request related to product creation and designated by an orderer for a printing business operator is executed.

Similarly, in step S1503, analysis processing of JDF data is executed among the data input in step S1501. The analysis processing corresponds to the analysis processing of JDF data described in an XML format and illustrated in FIG. 12A. In other words, processing of acquiring various types of information regarding job execution conditions and setting information that are related to product creation and designated by an orderer for a printing business operator is executed.

In step S1504, from information regarding a result of PRX analysis executed in step S1502, request information regarding various types of product quality that is designated by an orderer for a printing business operator is acquired and determined.

In step S1505, it is determined whether a quality setting regarding a variation of the value 1025 is included in the quality request information acquired and determined in step S1504. Specifically, it is determined whether PRX illustrated in FIGS. 12B1 and 12B2 includes the tolerable range information setting unit 1231. If a quality setting regarding a variation is not included (NO in step S1505), the processing proceeds to step S1506. In step S1506, inspection items are extracted for executing quality inspection of a product in a normal mode. In other words, extracted inspection items do not include an inspection item of a quality setting regarding a variation.

On the other hand, if a result of determination in step S1505 is true (YES in step S1505), the processing proceeds to step S1507. In step S1507, inspection items are extracted for executing quality inspection of a product including inspection of a quality setting regarding a variation, in a tolerable range designated mode. That is to say, inspection items for executing inspection regarding a variation (i.e., consistency and uniformity of quality) in the value 1025 required as a quality index of a product are also extracted.

In step S1508, processing of setting quality request information (quality inspection related information) that is set in PRX and designated by an orderer for a printing business operator at the time of production, in the inspection unit 214 is executed. Specifically, a setting for an inspection item regarding consistency and uniformity of quality is set in the inspection unit 214, among pieces of PRX information illustrated in FIGS. 12B1 and 12B2. Inspection items include the color quality information definition unit 1229, the image positional shift quality information definition unit 1241, and the barcode reading quality definition unit 1250 among pieces of PRX information illustrated in FIGS. 12B1 and 12B2. Then, an instruction to cause the inspection unit 214 to execute inspection of each of the above-described items at the time of production is issued.

It should be appreciated that setting processing for the inspection unit 214 is performed in step S1508 only for quality items (i.e., quality request items included in PRX) requested by an orderer from a printing business operator. In addition, in step S1508, processing of transmitting setting information in a job ticket analyzed in step S1503 is also executed.

Figure 16:
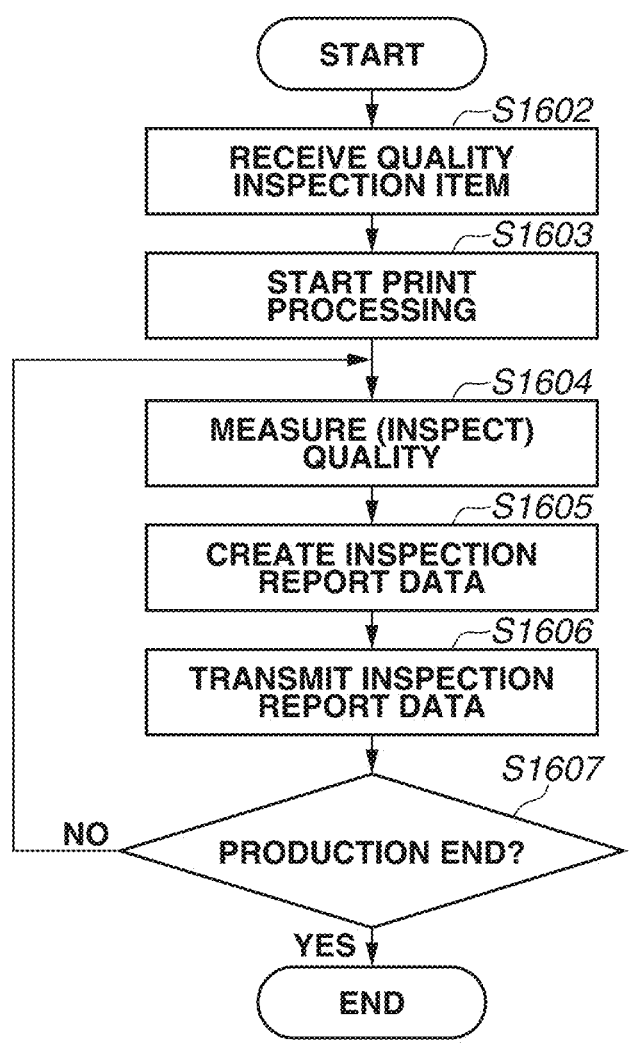
FIG. 16 is a flowchart illustrating processing to be executed by an inspection unit included in an image forming apparatus according to an exemplary embodiment.

FIG. 16 is a flowchart illustrating quality inspection processing defined by PRX, quality inspection result information creation processing, and transmission processing of an inspection result that are performed by the inspection unit 214 included in the image forming apparatus 103 or 104, based on conditions of inspection items that have been set in step S1508 of FIG. 15. An operation illustrated in the flowchart is implemented by the controller unit 205 executing the inspection program 410 stored in the HDD 209.

In step S1602, setting information of inspection items regarding quality requests described in all PRXs set in step S1508 of FIG. 15 is received. In step S1603, after setting information is set in the inspection unit 214, print processing is started.

In step S1604, based on inspection instruction information for the inspection unit 214 that has been received in step S1602, quality inspection processing is executed on each product having been subjected to print processing. Specifically, quality inspection processing designated by PRX is executed on image information formed on a sheet, by the controller unit 205 controlling the first to fourth inspection units 907, 908, 912, and 913 included in the inspection unit 214 illustrated in FIG. 9B, in accordance with the inspection program 410.

In step S1605, inspection result data in a format illustrated in FIG. 12C is created based on the execution result of step S1604, and in step S1606, transmission processing of the created inspection result data is executed from the image forming apparatus 103 or 104 to the workflow control unit 707. In step S1607, an end condition for repeatedly executing the above-described processing in steps S1604 to S1606 for each product is determined. That is to say, the processing in steps S1604 to S1606 is performed for each product.

Figure 17:
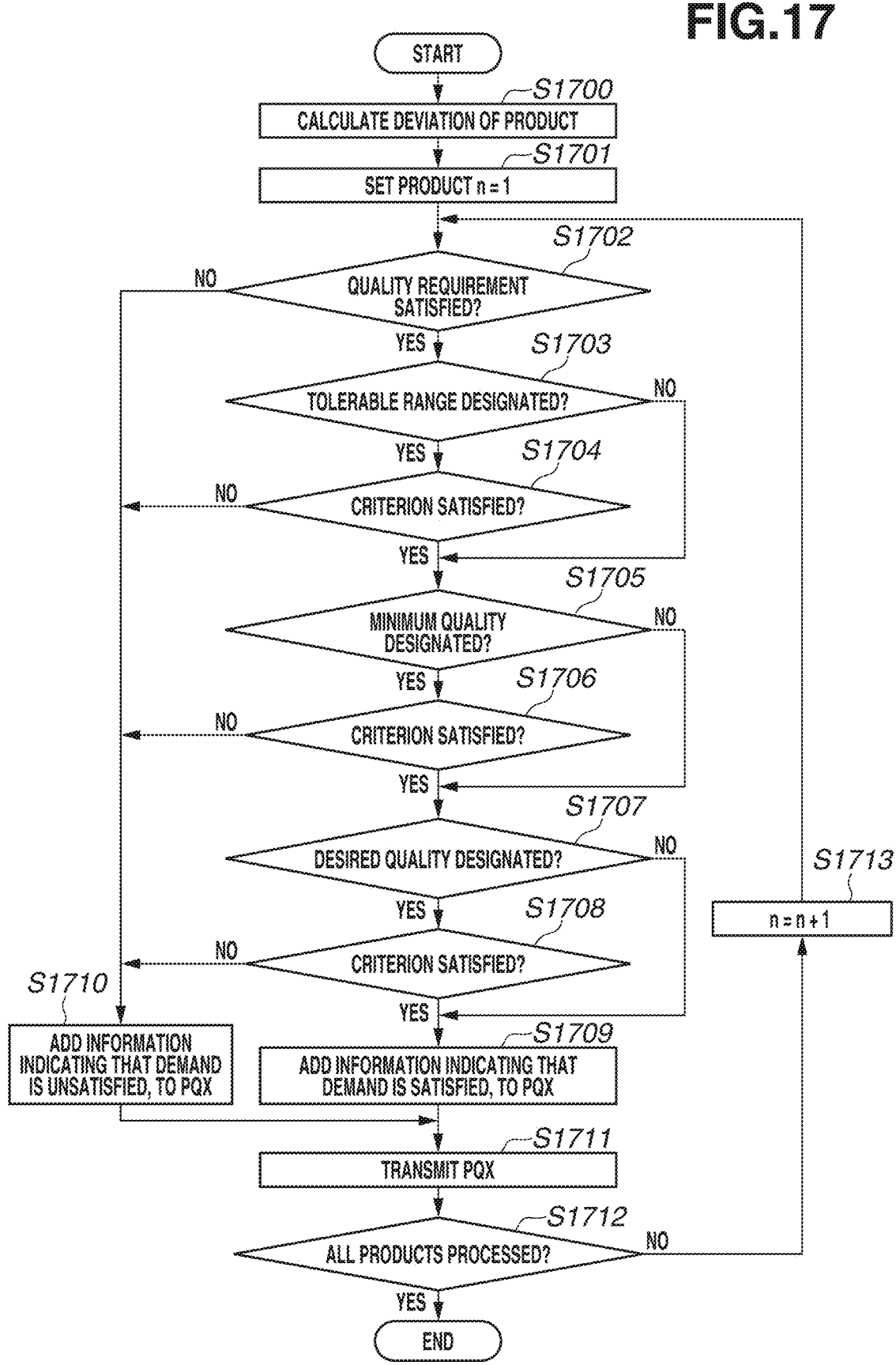
FIG. 17 is a third flowchart illustrating an operation of a workflow control unit according to an exemplary embodiment.

FIG. 17 is a flowchart illustrating processing to be performed in the printing business operator system 100 for the workflow control unit 707 generating PQX data from the inspection result data created in accordance with an operation of the flow illustrated in FIG. 16, and transmitted from the image forming apparatus 103 or 104. An operation illustrated in the flowchart is implemented by the CPU 301 executing the workflow control program 505 stored in the HDD 311.

In step S1700, information regarding each product serving as a report target is accumulated, and an average value and a deviation of the product are calculated. In this step, an average value and a deviation of all products serving as a report target are calculated. Nevertheless, an average value and a deviation may be calculated using products satisfying quality of each individual product. Specifically, determination in step S1702 to be described below is made for each individual product, and products determined to be YES in step S1702 are targeted. Alternatively, determination in steps S1702 and S1705 to be described below is made for each individual product, and products determined to be YES both in steps S1702 and S1705 may be targeted.

In step S1701, product n=1 is set. That is to say, processing in step S1702 and subsequent steps is performed on the first product. In step S1702, it is determined whether a quality requirement of each individual product that is requested in PRX data is satisfied. In the example of PRX data in FIGS. 12B1 and 12B2, the tolerable range information setting unit 1231 corresponds to a request for a plurality of products not for each individual product. Thus, it is determined whether a quality requirement of each individual product that is included in PRX data excluding the tolerable range information setting unit 1231 is satisfied. If it is determined to be YES in step S1702 (YES in step S1702), the processing proceeds to step S1703. In step S1703, it is determined whether the PRX data includes the tolerable range information setting unit 1231. That is to say, it is determined whether an order acceptor sets a tolerable range. FIGS. 12B1 and 12B2 illustrates an example of PRX data including the tolerable range information setting unit 1231. In this example, 1.0 is designated as a value of a tolerable range. That is to say, it is indicated that the order acceptor demands a product set with a value of the value 1025 that falls within the range of 1.0. If it is determined to be YES in step S1703 (YES in step S1703), the processing proceeds to step S1704. In step S1704, it is determined whether a product satisfies the tolerable range designated in the PRX data. Specifically, the example of the first product in FIG. 13B does not satisfy the tolerable range, and the example of the second product satisfies the tolerable range. If it is determined to be YES in step S1704 (YES in step S1704), the processing proceeds to step S1705.

In step S1705, it is determined whether the PRX data includes a minimum quality request definition unit 1801. That is to say, it is determined whether an order acceptor sets minimum quality. FIG. 18A illustrates an example of PRX data including the minimum quality request definition unit 1801. In this example, 5.0 is designated as a value of a minimum quality request. That is to say, it is indicated that the order acceptor demands a product with a value of the value 1025 that is equal to or larger than 5.0. If it is determined to be YES in step S1705 (YES in step S1705), the processing proceeds to step S1706. In step S1706, it is determined whether a product satisfies a value with minimum quality that is designated in the PRX data. Specifically, the example of the first product in FIG. 13B does not satisfy the value. If it is determined to be YES in step S1706 (YES in step S1706), the processing proceeds to step S1707.

In step S1707, it is determined whether the PRX data includes a desired quality request definition unit 1804. That is to say, it is determined whether an order acceptor sets desired quality. FIG. 18B illustrates an example of PRX data including the desired quality request definition unit 1804. In this example, 6.0 is designated as a value of a desired quality request. That is to say, it is indicated that the order acceptor demands a product with a value of the value 1025 that is about 6.0. If it is determined to be YES in step S1707 (YES in step S1707), the processing proceeds to step S1708. In step S1708, it is determined whether a product satisfies a value of desired quality that is designated in the PRX data. As an example of a method of determination in step S1708, if a value of a desired quality request is 6.0 and a value of a tolerable range is 1.0, a product with a value falling within a range of 5.0 to 7.0 is determined to satisfy desired quality. If it is determined to be YES in step S1708 (YES in step S1708), the processing proceeds to step S1709.

In step S1709, information indicating that demand is satisfied is added to PQX. In step S1710, information indicating that demand is unsatisfied is added to PQX. The information is added to a product not satisfying the minimum quality request definition unit 1801 or the desired quality request definition unit 1804 that has been determined at the beginning, or a product determined not to satisfy the tolerable range information setting unit 1231. In step S1711, a quality report corresponding to a quality request designated in PRX is converted into data in a PQX format, and the converted PQX is transmitted. The transmission processing in step S1711 corresponds to the processing in step S729 of FIG. 7.

In step S1712, it is determined whether the processing has been performed on all the products. If it is determined to be NO (NO in step S1712), the processing proceeds to step S1713. In step S1713, n=n+1 is set, and the processing returns to step S1702.

Modified Example 1

In the flowchart in FIG. 17, whether quality of each individual product is satisfied (steps S1702 and S1705), and whether a tolerable variation in quality among a plurality of products is satisfied (step S1703) are determined for each product. Nevertheless, whether quality of each individual product is satisfied (steps S1702 and S1705) may be determined first, and a deviation of products may be calculated using only products satisfying determination in both steps S1702 and S1705. Then, whether a tolerable variation in quality among a plurality of products is satisfied (step S1703) may be determined using products satisfying determination in both steps S1702 and S1705.

Modified Example 2

In the flowchart in FIG. 17, after a deviation of products is obtained in step S1700, whether the tolerable range information setting unit 1231 is satisfied, whether the minimum quality request definition unit 1801 is satisfied, and whether the desired quality request definition unit 1804 is satisfied are determined. Nevertheless, if the PRX data includes the minimum quality request definition unit 1801 and the desired quality request definition unit 1804, determination may be made as follows. More specifically, first of all, whether the minimum quality request definition unit 1801 is satisfied and whether the desired quality request definition unit 1804 is satisfied is determined for each product. A deviation of products determined to satisfy the minimum quality request definition unit 1801 and the desired quality request definition unit 1804 is obtained, and whether the tolerable range information setting unit 1231 is satisfied is determined using these products. Consequently, as for products determined to satisfy the tolerable range information setting unit 1231, in step S1709, information indicating that demand is satisfied is added to PQX. In addition, as for a product determined not to satisfy the minimum quality request definition unit 1801 or the desired quality request definition unit 1804, or a product determined not to satisfy the tolerable range information setting unit 1231, in step S1710, information indicating that demand is unsatisfied is added to PQX.

Modified Example 3

If PRX data includes the tolerable range information setting unit 1231 and the desired quality request definition unit 1804, determination may be made as follows. The description will be given of an example case where the desired quality request definition unit 1804 is also included in addition to the tolerable range information setting unit 1231 (i.e., the PRX illustrated in FIG. 18B). That is to say, a quality request designating that a tolerable range of the value 1025 of tolerable product quality is 1.0, and the value 1025 of desired quality is 6.0 is demanded.

Figure 19:
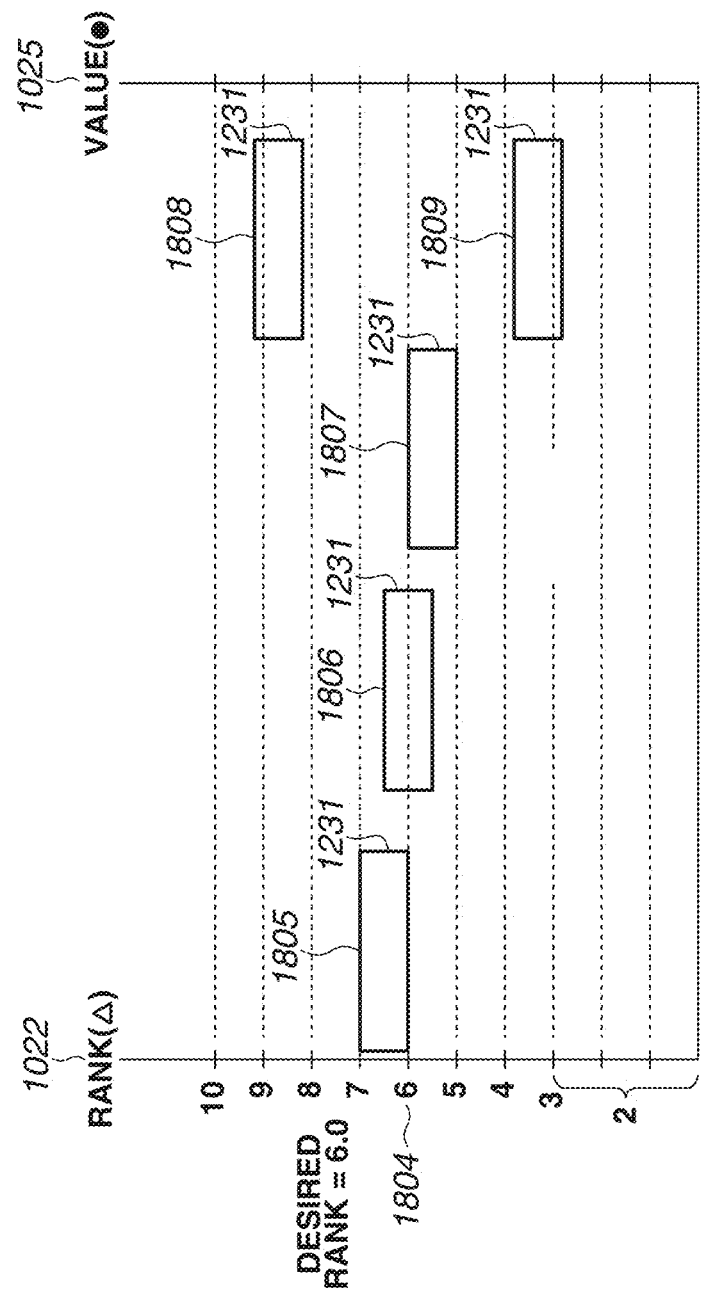
FIG. 19 is a diagram illustrating determination according to Modified Example 3 of an exemplary embodiment.

FIG. 19 is a diagram illustrating determination according to Modified Example 3.

A pattern 1 (1805) corresponds to an example in which 6.0 designated as the value 1025 of desired quality defined by the desired quality request definition unit 1804 is included, and the variation tolerable range 1231 of quality falls within the range of 1.0 defined by the tolerable range information setting unit 1231.

A pattern 2 (1806) and a pattern 3 (1807) are similar, and a tolerable range of the value 1025 of tolerable product quality is 1.0 while included ranges are different from each other. Both satisfy that the value 1025 of desired quality includes 6.0 being a setting defined by the desired quality request definition unit 1804. Thus, production of a product and a quality report are executed in such a manner that the value falls within such a value 1025.

On the other hand, in a pattern 4 (1808) and a pattern 5 (1809), while a tolerable range of the value 1025 of tolerable product quality is 1.0, the value 1025 of desired quality does not include 6.0 being a setting defined by the desired quality request definition unit 1804. Thus, because both of different two quality conditions of PRX designated in FIG. 18B are unsatisfied, the production having a distribution of such a value 1025 does not meet a quality condition requested by an orderer from a printing business operator.

Nevertheless, the pattern 4 (1808) is a quality condition exceeding the desired quality request definition unit 1804, and a tolerable range of the value 1025 of product quality satisfies 1.0. Thus, quality designation is performed while regarding quality as good production quality, and control and determination can be performed.

Modified Example 4

In the above-described exemplary embodiment, the description has been given of an example in which an average value of the values 1025 being quality indices are obtained using a specific number of produced products as a total number, dispersion from the obtained average is further calculated, and whether the value falls within a tolerable range defined by the tolerable range setting unit 1029 is determined.

Nevertheless, in the case of producing a large number of products over a long period of time and over a period of days, the following items to be further considered exist. The same product is assumed to be produced for each set of a definite number of products, for example. At this time, if an apparatus is continuously operated, various environments in production (temperature, humidity, production season of a paper-manufacturing company of stocked sheets, and the like) is maintained in a state in which a variation is suppressed to some extent. That is to say, uniformity of quality states of the respective products continuously produced is maintained to some extent. Nevertheless, a case where a discontinuous condition is caused in a production state by stopping the operation of an apparatus after a definite number of products are produced, or carrying the production over the next day will be assumed. Alternatively, a case where new sheets ordered by lot are received from a paper-manufacturing company and production is executed will also be assumed. In this case, even if a variation in value 1025 being a quality index among products in the same production unit is suppressed, quality indices (i.e., numerical values of the values 1025) of the respective production units can vary in some cases. Thus, as a modified example, a unit of a product set by which a variation is determined is further made designatable.

Figure 20A:
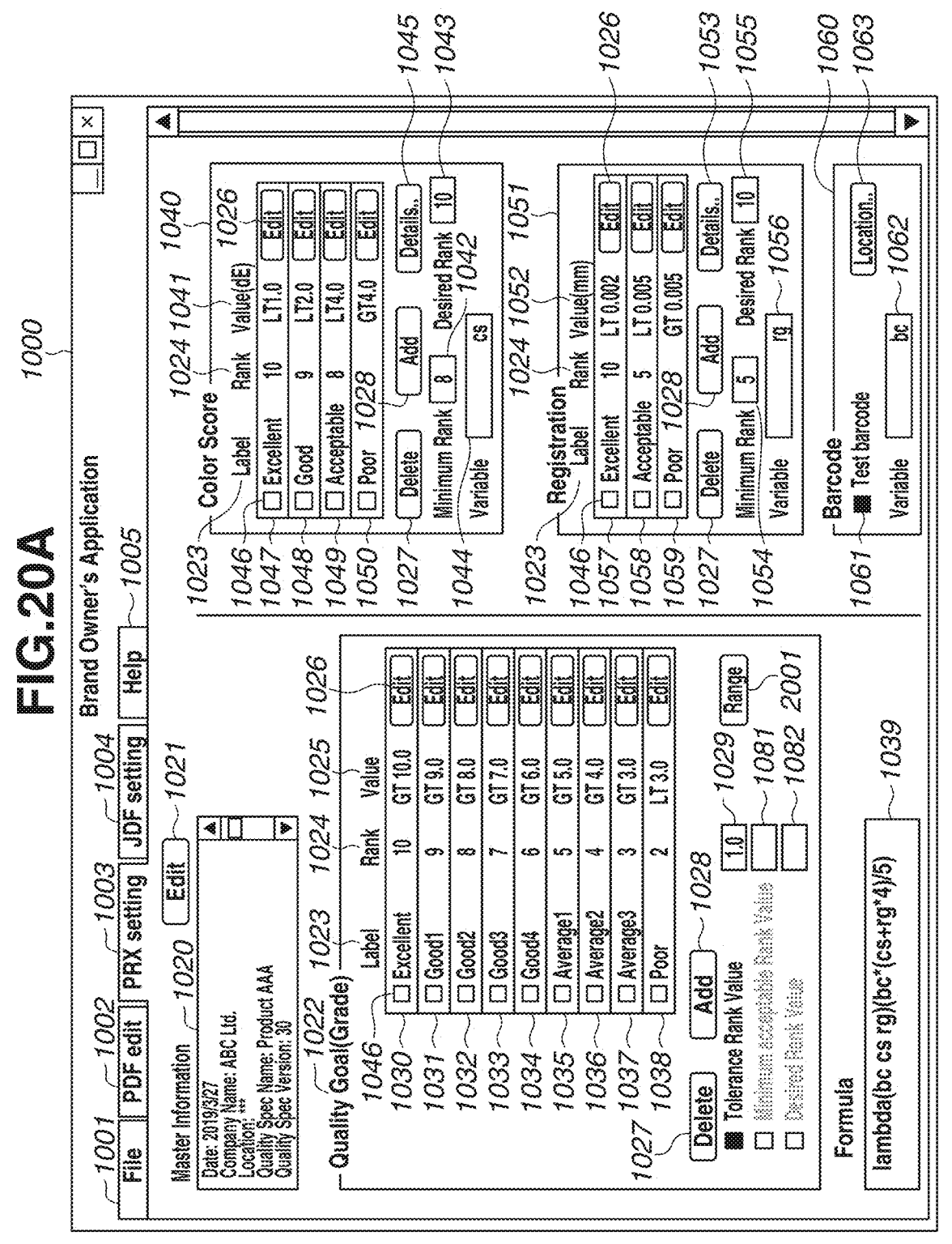

FIG. 20A illustrates an example of an application screen for creating or editing PRX being input target quality request data, on the information processing apparatus 110 in the orderer system 109 according to Modified Example 4. A production unit designation unit 2001 is added to the screen illustrated in FIG. 10B. The production unit designation unit 2001 is a setting unit for designating a production unit of targeted products for considering a variation level of quality. By selecting the production unit designation unit 2001, the application screen transitions to a screen illustrated in FIG. 20B.

FIG. 20B illustrates a screen 2002 displayed for designating a production unit of products for determining a variation level of quality. In the example illustrated in FIG. 20B, the following production unit is defined as a designatable production unit of products.

A number of copies setting unit 2003 is a designation unit for issuing an instruction to determine a variation of the value 1025 of a product quality index, using each set of the designated number of copies (2006) as a parameter. FIG. 20B illustrates an example case where a variation degree of the value 1025 is determined for each set of 1000 copies.

A number of lots setting unit 2004 is a designation unit for issuing an instruction to determine a variation degree of the value 1025 for each set called a lot by which a printing business operator or an orderer performs order placement, production, or delivery. FIG. 20B illustrates an example in which designation is performed for determining a variation in product quality for each set of 100 lots, and the number of products included in one lot can be further designated using a number of items per lot designation unit 2008. FIG. 20B illustrates an example case where the number of items per lot is set to 500.

For obtaining a variation suppression effect of the value 1025 of a quality index in all production processes of products instead of obtaining the effect for each set of the number of copies or each set of the number of lots described above, an all item setting unit 2005 is selected.

The number of copies setting unit 2003, the number of lots setting unit 2004, and the all item setting unit 2005 are made exclusively selectable. FIG. 20B illustrates an example case where the number of copies setting unit 2003 is selected.

An OK button 2009 is an operation unit for determining the selection made using each of the above-described setting units, and then transitioning again to the screen illustrated in FIG. 20A. A cancel button 2010 is provided as an operation unit for cancelling a setting operation performed using each of the above-described setting units, and then transitioning again to the screen illustrated in FIG. 20A.

It is sufficient that the processing in the flowchart in FIG. 17 is executed for each unit designated in FIG. 20B.

According to the above-described exemplary embodiment, it becomes possible to designate a quality request in such a manner that not only quality of each individual product but also quality uniformity among product sets each including a plurality of products is ensured as quality of products. Then, it also becomes possible to perform production and quality inspection while ensuring quality uniformity that is based on the designation.

In the above-described exemplary embodiment, instead of designating a uniquely-determined tolerable range of quality (for example, a value of the value 1025 is 4 to 6), an order acceptor designates a tolerable range of quality of a plurality of products (for example, values of the values 1025 of a plurality of products are 2 or less). Thus, if quality is cleared in another item, irrespective of the level of the quality of a product set, a product set not including a product with extremely outstanding quality can be generated. For example, irrespective of whether an image forming apparatus is likely to generate a product with a high value of the value 1025, or an image forming apparatus is likely to generate a product with a not so high value of the value 1025, a quality level of a product set can be ensured.

According to the above-described exemplary embodiment, it becomes possible to make a quality request of a product that considers not only the quality of the product but also a variation in quality among product sets.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-125691, filed Jul. 22, 2020, which is hereby incorporated by reference herein in its entirety.

What is claimed is:

1. A system comprising:
a first information processing apparatus; and
a second information processing apparatus,
wherein the first information processing apparatus includes
at least one memory; and
at least one processor
wherein when executing a program stored in the at least one memory, the processor causes the apparatus to operate as:
a first reception unit configured to receive a setting of a print quality request of a printed product,
a second reception unit configured to receive a setting of a tolerable variation of a print quality request of a plurality of printed products, and
a transmission unit configured to transmit quality request data of a printed product including information regarding a print quality request of the printed product, and information regarding a tolerable variation of a print quality request of the plurality of printed products,
wherein the second information processing apparatus includes
at least one memory; and
at least one processor
wherein when executing a program stored in the at least one memory, the processor causes the apparatus to operate as:
a receiving unit configured to receive quality request data of a printed product including information regarding a print quality request of the printed product, and information regarding a tolerable variation of a print quality request of the plurality of printed products, and
a determination unit configured to determine whether quality of a printed product is satisfied, based on information regarding a print quality request of a printed product, and information regarding a tolerable variation of a print quality request of a plurality of printed products that is included in the quality request, and
wherein, in a case where the printed product satisfies a print quality request of a printed document that is included in the quality request data, in a case where the printed product does not satisfy a tolerable variation included in the quality request data, it is determined that the printed product does not satisfy a print quality request.

2. The system according to claim 1, wherein the second information processing apparatus further includes
a generation unit configured to generate quality report data of a printed product based on a determination result of the determination unit, and
a transmission unit configured to transmit the generated quality report data of the printed product.

3. The system according to claim 1, wherein the quality request data of the printed product further includes information regarding minimum quality of a printed product.

4. An information processing apparatus comprising:
at least one memory; and
at least one processor wherein when executing a program stored in the at least one memory, the processor causes the apparatus to operate as:

a receiving unit configured to receive quality request data of a printed product including information regarding a print quality request of a printed product, and information regarding a tolerable variation of a print quality request of a plurality of printed products; and a determination unit configured to determine whether quality of a printed product is satisfied, based on information regarding a print quality request of a printed product, and information regarding a tolerable variation of a print quality request of a plurality of printed products that is included in the quality request, wherein, in a case where the printed product satisfies a print quality request of a printed document that is included in the quality request data, and in a case where the printed product does not satisfy a tolerable variation included in the quality request data, it is determined that the printed product does not satisfy a print quality request.

5. The information processing apparatus according to claim 4, further comprising:

a generation unit configured to generate quality report data of a printed product based on a determination result of the determination unit; and a transmission unit configured to transmit the generated quality report data of the printed product.

6. The information processing apparatus according to claim 4, wherein the quality request data of the printed product further includes information regarding minimum quality of a printed product.

7. A control method of an information processing apparatus, the control method comprising:

receiving quality request data of a printed product including information regarding a print quality request of a printed product, and information regarding a tolerable variation of a print quality request of a plurality of printed products; and determining whether quality of a printed product is satisfied, based on information regarding a print quality request of a printed product, and information regarding a tolerable variation of a print quality request of a plurality of printed products that is included in the quality request, wherein, in a case where the printed product satisfies a print quality request of a printed document that is included in the quality request data, in a case where the printed product does not satisfy a tolerable variation included in the quality request data, it is determined that the printed product does not satisfy a print quality request.

8. The control method of an information processing apparatus according to claim 7, further comprising:

generating quality report data of a printed product based on a determination result of the determining; and transmitting the generated quality report data of the printed product.

9. The control method of an information processing apparatus according to claim 7, wherein the quality request data of the printed product further includes information regarding minimum quality of a printed product.

* * * * *